(12) United States Patent
Ota et al.

(10) Patent No.: US 7,084,946 B2
(45) Date of Patent: Aug. 1, 2006

(54) METHOD OF FORMING INORGANIC ALIGNMENT FILM, INORGANIC ALIGNMENT FILM, SUBSTRATE FOR ELECTRONIC DEVICE, LIQUID CRYSTAL PANEL AND ELECTRONIC APPARATUS

(75) Inventors: Hidenobu Ota, Suwa (JP); Yukihiro Endo, Suwa (JP); Osamu Iwamoto, Chino (JP)

(73) Assignee: Seiko Epson Corporation (JP)

( * ) Notice: Subject to any disclaimer, the term of this patent is extended or adjusted under 35 U.S.C. 154(b) by 120 days.

(21) Appl. No.: 10/931,808

(22) Filed: Sep. 1, 2004

(65) Prior Publication Data

US 2005/0078248 A1 Apr. 14, 2005

(30) Foreign Application Priority Data

Sep. 4, 2003 (JP) .............................. 2003-313317

(51) Int. Cl.
*G02F 1/1337* (2006.01)
*B05D 3/00* (2006.01)
*C09K 19/00* (2006.01)

(52) U.S. Cl. ...................... 349/123; 349/124; 427/532; 428/1.21

(58) Field of Classification Search ........ 349/123–125; 428/1.21; 427/532
See application file for complete search history.

(56) References Cited

U.S. PATENT DOCUMENTS

| 5,710,608 | A | * | 1/1998 | Nakabayashi et al. ...... 349/125 |
| 5,770,826 | A | * | 6/1998 | Chaudhari et al. ..... 204/157.15 |
| 6,020,946 | A | * | 2/2000 | Callegari et al. ............ 349/124 |
| 6,061,114 | A | * | 5/2000 | Callegari et al. ............ 349/125 |
| 6,632,483 | B1 | * | 10/2003 | Cesare Callegari et al. 427/526 |
| 6,665,033 | B1 | * | 12/2003 | Callegari et al. ............ 349/123 |
| 6,967,340 | B1 | * | 11/2005 | Lee et al. ............... 250/492.21 |
| 2002/0163612 | A1 | * | 11/2002 | Chaudhari et al. .......... 349/124 |
| 2004/0151911 | A1 | * | 8/2004 | Callegari et al. ............ 428/408 |

FOREIGN PATENT DOCUMENTS

| JP | 05-088177 | 4/1993 |
| JP | 10-161133 | 6/1998 |
| JP | 2002-287146 | 10/2002 |
| JP | 2003-156745 | 5/2003 |
| JP | 2003-165175 | 6/2003 |
| JP | 2003-167255 | 6/2003 |
| JP | 2003-172936 | 6/2003 |
| JP | 2003-186018 | 7/2003 |

* cited by examiner

*Primary Examiner*—Tarifur R. Chowdhury
(74) *Attorney, Agent, or Firm*—Harness, Dickey & Pierce, P.L.C.

(57) ABSTRACT

A method of forming an inorganic alignment film is provided comprising a first milling step of irradiating ion beams to a surface of a base substrate, on which the inorganic alignment film is to be formed, from a direction inclined at a predetermined angle $\theta_a$ with respect to a direction orthogonal to the surface of the base substrate, a film-forming step of forming a film made substantially of an inorganic material on the base substrate to which the ion beams are irradiated, and a second milling step of irradiating ion beams to a surface of the film from a direction inclined at a predetermined angle $\theta_b$ with respect to the direction orthogonal to the surface of the film.

21 Claims, 11 Drawing Sheets

METHOD OF FORMING INORGANIC ALIGNMENT FILM, INORGANIC ALIGNMENT FILM, SUBSTRATE FOR ELECTRONIC DEVICE, LIQUID CRYSTAL PANEL AND ELECTRONIC APPARATUS

RELATED APPLICATIONS

This application claims priority to Japanese Patent Application No. 2003-313317 filed Sep. 4, 2003 which is hereby expressly incorporated by reference herein in its entirety.

BACKGROUND

1. Technical Field

The present invention relates to a method of forming an inorganic alignment film, an inorganic alignment film, a substrate for an electronic device, a liquid crystal panel, and an electronic apparatus.

2. Background Art

A projection display device in which an image is projected on a screen is known. In the projection display device, a liquid crystal panel is mainly used to form an image.

Normally, such a liquid crystal panel has an alignment film which is set to have a predetermined pretilt angle, thereby aligning liquid crystal molecules in a desired direction. In manufacturing the alignment film, a method of rubbing a thin film made of a polymer compound such as polyimide, which is formed on a substrate, in a certain direction by using a cloth such as rayon is known (for example, see Japanese Unexamined Patent Application Publication No. 10-161133 (Claims)).

However, the alignment film made of a polymer compound such as polyimide commonly causes optical deterioration according to the environment and duration of use. When optical deterioration occurs, materials constituting the alignment film, the liquid crystal layer, and so on decompose, which adversely affects the performance of the liquid crystal or the like. Further, static electricity or dust particles are generated by the rubbing process, which may result in lowering the reliability of the display devices.

It is an object of the present invention to provide an inorganic alignment film having excellent light resistance and capable of controlling a pretilt angle more effectively, a substrate for an electronic device having the inorganic alignment film, a liquid crystal panel, and an electronic apparatus. Further, it is another object of the present invention to provide a method of forming the inorganic alignment film.

SUMMARY

These objects can be achieved by the present invention described below.

A method of forming an inorganic alignment film according to the present invention comprises a first milling step of irradiating ion beams to a surface of the base substrate, on which the inorganic alignment film is to be formed, from a direction inclined at a predetermined angle $\theta_a$ with respect to a direction orthogonal to the surface of the base substrate, a film-forming step of forming a film made substantially of an inorganic material on the base substrate to which the ion beams are irradiated, and a second milling step of irradiating ion beams to a surface of the film from a direction inclined at a predetermined angle $\theta_b$ with respect to the direction orthogonal to the surface of the base substrate on which the film is formed.

Therefore, it is possible to obtain an inorganic alignment film having excellent light resistance and capable of controlling a pretilt angle more effectively.

In the method of forming an inorganic alignment film of the present invention, in the first milling step, concave portions having a predetermined directivity may be formed in the surface of the base substrate on which the film is formed.

Therefore, it is possible to form an inorganic alignment film having an excellent ability for regulating the degree of alignment of the liquid crystal molecules.

In the method of forming an inorganic alignment film of the present invention, in the first milling step, the predetermined angle $\theta_a$ is preferably 2° or more.

Therefore, it is possible to efficiently form concave portions having a predetermined directivity on the substrate and to form a suitable pretilt angle more effectively.

In the method of forming an inorganic alignment film of the present invention, in the first milling step, the acceleration voltage of the ion beams during the irradiation of the ion beams is preferably 400 to 1400 V.

Therefore, it is possible to more efficiently form each concave portion with a suitable inclined surface on the substrate.

In the method of forming an inorganic alignment film of the present invention, in the first milling step, the current of the ion beams irradiated is preferably 100 to 1000 mA.

Therefore, it is possible to more efficiently form a plurality of concave portions at random positions on the substrate. As a result, the inorganic alignment film can more effectively regulate the degree of alignment of the liquid crystal molecules.

In the method of forming an inorganic alignment film of the present invention, in the first milling step, the pressure of an atmosphere in the vicinity of the base substrate is preferably $5.0 \times 10^{-1}$ Pa or less.

Therefore, it is possible to improve the rectilinearity of the ion beams, and thus the concave portions each having an inclined surface at a suitable angle on the substrate can be more efficiently formed.

In the method of forming an inorganic alignment film of the present invention, in the second milling step, concave portions having a predetermined directivity are preferably formed on the film.

Therefore, it is possible to obtain the inorganic alignment film having an excellent ability for regulating the degree of alignment of the liquid crystal molecules.

In the method of forming an inorganic alignment film of the present invention, in the second milling step, the predetermined angle $\theta_b$ is preferably 2° or more.

Therefore, it is possible to form the concave portions having a predetermined directivity more efficiently and to form a suitable pretilt angle more efficiently.

In the method of forming an inorganic alignment film of the present invention, in the second milling step, the acceleration voltage of the ion beams during the irradiation of the ion beams is preferably 400 to 1400 V.

Therefore, it is possible to form the concave portions each having a suitable inclined surface on the inorganic alignment film more efficiently.

In the method of forming an inorganic alignment film of the present invention, in the second milling step, the current of the ion beams irradiated is preferably 100 to 1000 mA.

Therefore, it is possible to form a plurality of concave portions at random positions on the film. As a result, the inorganic alignment film can more effectively regulate the degree of alignment of the liquid crystal molecules.

In the method of forming an inorganic alignment film of the present invention, in the second milling step, the pressure of an atmosphere in the vicinity of the film is preferably $5.0 \times 10^{-1}$ Pa or less.

Therefore, it is possible to improve the rectilinearity of the ion beams, and thus it is possible to form the concave portions having a predetermined directivity more efficiently.

In the method of forming an inorganic alignment film of the present invention, in the film-forming step, the film is preferably formed by a sputtering method.

Therefore, it is possible to form the film more efficiently.

In the method of forming an inorganic alignment film of the present invention, the inorganic material may be substantially composed of silicon oxide.

Therefore, a resulting liquid crystal panel has an even more excellent light resistance.

An inorganic alignment film of the present invention is formed by a method of forming an inorganic alignment film of the present invention.

Therefore, it is possible to provide the inorganic alignment film having excellent light resistance and capable of effectively controlling the pretilt angle.

In the inorganic alignment film of the present invention, the average thickness of the inorganic alignment film is preferably 0.02 through 0.3 μm.

Therefore, it is possible to form a more suitable pretilt angle and also control the alignment state of the liquid crystal molecules more accurately.

A substrate for an electronic device of the present invention comprises electrodes and an inorganic alignment film of the present invention on a substrate.

Therefore, it is possible to provide the substrate for an electronic device with excellent light resistance.

A liquid crystal panel of the present invention comprises an inorganic alignment film of the present invention and a liquid crystal layer.

Therefore, it is possible to provide a liquid crystal panel having excellent light resistance.

A liquid crystal panel of the present invention comprises a pair of inorganic alignment films, each being formed by a method of forming an inorganic alignment film according to the present invention, and a liquid crystal layer interposed between the pair of inorganic alignment films.

Therefore, it is possible to provide a liquid crystal panel having excellent light resistance.

An electronic apparatus of the present invention comprises a liquid crystal panel of the present invention.

Therefore, it is possible to provide an electronic apparatus with high reliability.

An electronic apparatus of the present invention comprises light valves each having a liquid crystal panel of the present invention in which an image is projected using at least one of the light valves.

Therefore, it is possible to provide the electronic apparatus having a high reliability.

An electronic apparatus of the present invention comprises three light valves, each corresponding to red, green and blue which form an image, a light source, a color separating optical system for separating light from the light source into red, green and blue light components and guiding each light to the corresponding light valve, and a color synthesizing optical system for synthesizing the image, and a projecting optical system for projecting the synthesized image, each light valve comprising a liquid crystal panel of the present invention.

Therefore, it is possible to provide an electronic apparatus with high reliability.

According to the present invention, it is possible to provide an inorganic alignment film having excellent light resistance and capable of controlling a pretilt angle more effectively, a substrate for an electronic device comprising the inorganic alignment film, a liquid crystal panel and an electronic apparatus. Further, it is possible to provide a method of forming the inorganic alignment film.

DETAILED DESCRIPTION

A method of forming an inorganic alignment film, a substrate for an electronic device, a liquid crystal panel and an electronic apparatus will now be described in detail with reference to the attached drawings.

First, prior to describing the method of forming the inorganic alignment film, the liquid crystal panel of the present invention will be described.

Figure 1:
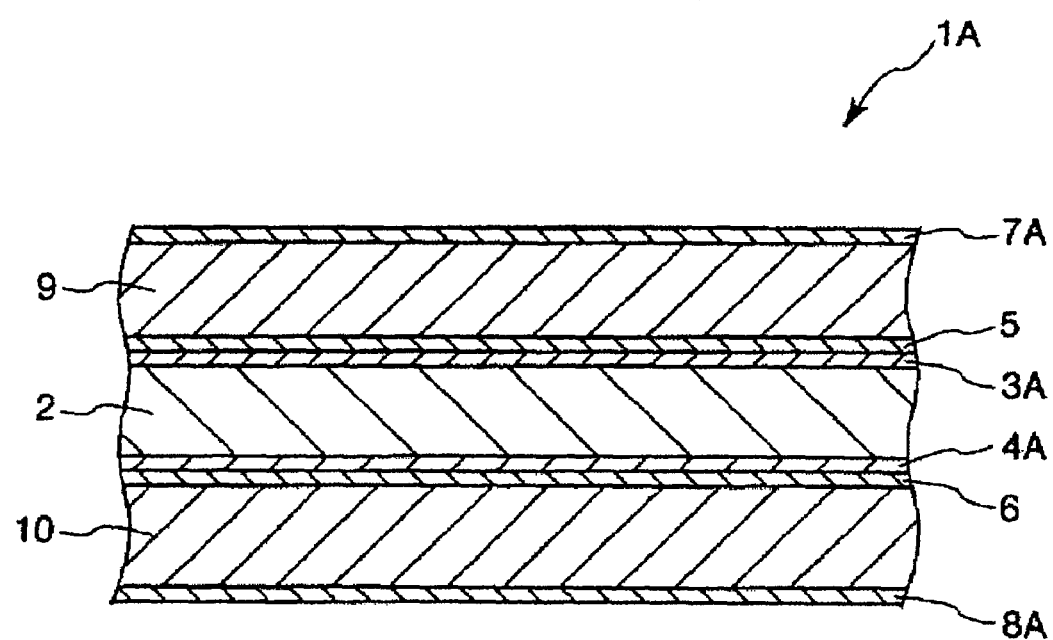
FIG. 1 is a schematic longitudinal cross-sectional view showing a first embodiment of a liquid crystal panel according to the present invention.
Figure 2:
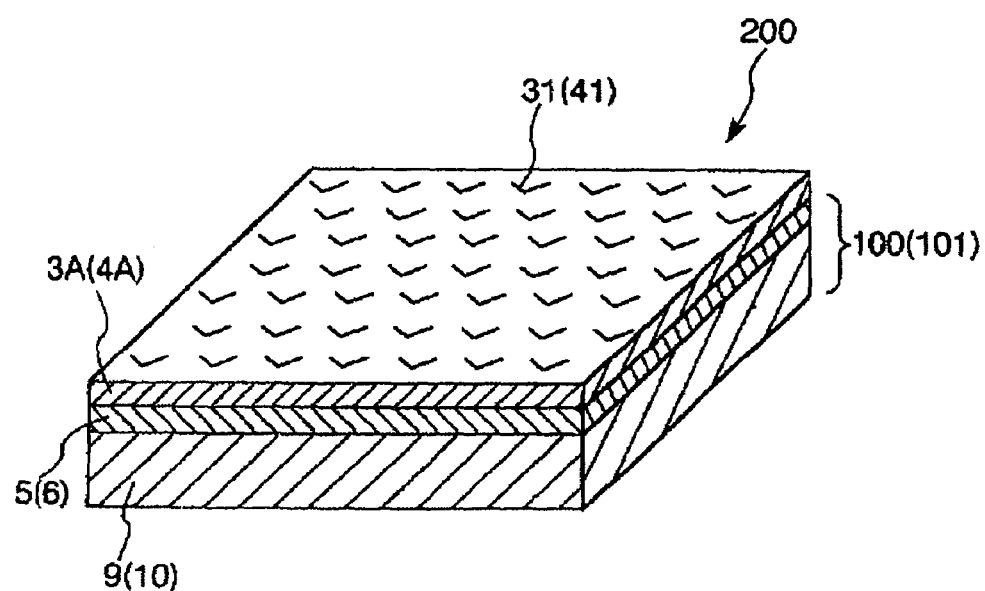
FIG. 2 is a partial perspective view showing schematically a surface state of an inorganic alignment film formed by a method according to the present invention.
Figure 3:
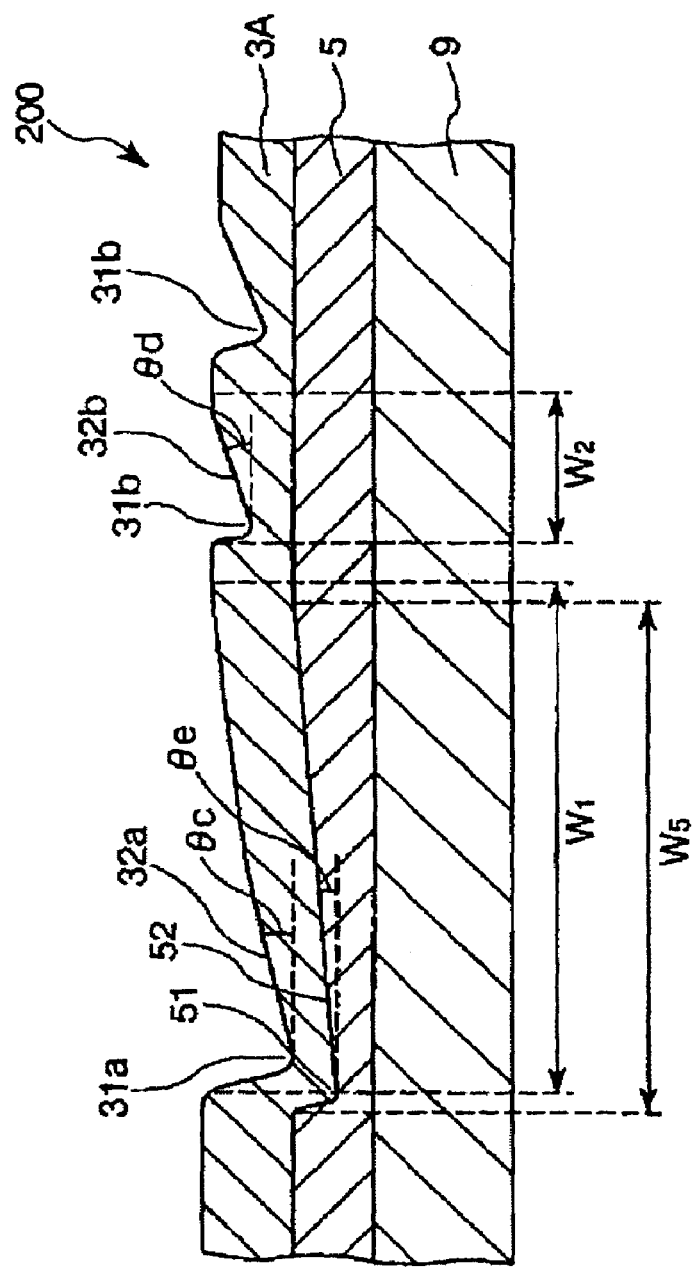
FIG. 3 is a partial longitudinal cross-sectional view showing an inorganic alignment film formed by a method according to the present invention.

FIG. 1 is a schematic longitudinal cross-sectional view showing a first embodiment of the liquid crystal panel according to the present invention. FIG. 2 is a partial perspective view showing schematically a surface state of an inorganic alignment film formed by a method according to the present invention. FIG. 3 is a partial longitudinal cross-sectional view showing an inorganic alignment film formed by a method according to the present invention. Hereinafter, the upper side and the lower side in FIG. 3 are referred as 'an upper portion' and 'a lower portion', respectively.

As shown in FIG. 1, a liquid crystal panel 1A has a liquid crystal layer 2, inorganic alignment films 3A and 4A, transparent conductive films 5 and 6, polarizing films 7A and 8A, and substrates 9 and 10.

In such a construction, a substrate 200 for electronic devices of the present invention is formed by the substrate 9, the transparent conductive film 5 (electrode), and the inorganic alignment film 3A, or by the substrate 10, the transparent conductive film 6 (electrode), and the inorganic alignment film 10A.

The liquid crystal layer 2 is substantially made of liquid crystal molecules.

The liquid crystal molecules constituting the liquid crystal layer 2 include liquid crystal molecules obtained by aligning nematic liquid crystal, smectic liquid crystal, or the like, but, in a TN liquid crystal panel, it is preferable to use nematic liquid crystal. For example, phenylcyclohexane-derivative liquid crystal, biphenyl-derivative liquid crystal, biphenyl-cyclohexane-derivative liquid crystal, terphenyl-derivative liquid crystal, phenylether-derivative liquid crystal, phenylester-derivative liquid crystal, bicyclohexane-derivative liquid crystal, azomethine-derivative liquid crystal, azoxy-derivative liquid crystal, pyrimidine-derivative liquid crystal, dioxane-derivative liquid crystal, and cubane-derivative liquid crystal are included. The liquid crystal molecules obtained by introducing a fluoric substituent, such as a monofluoro group, a difluoro group, a trifluoro group, a trifluoromethyl group, a trifluoromethoxy group, and a difluoromethoxy group, into the nematic liquid crystal are included.

On both surfaces of the liquid crystal layer 2, the inorganic alignment films 3A and 4A are arranged. Further, the inorganic alignment film 3A is formed on a base substrate 100 comprising the transparent conductive film 5 and the substrate 9 as described below, and the inorganic alignment film 4A is formed on a base substrate 101 comprising the transparent conductive film 6 and the substrate 10 as described below.

The inorganic alignment films 3A and 4A have a function of regulating the alignment state of the liquid crystal molecules constructing the liquid crystal layer 2 when a no voltage is applied.

Such inorganic alignment films 3A and 4A are formed, for example, by a method described below, that is, a method of forming an inorganic alignment film according to the present invention.

As shown in FIG. 2, the inorganic alignment film 3A has a plurality of concave portions 31 having a predetermined directivity. Similarly, the inorganic alignment film 4A has a plurality of concave portions 41 having a predetermined directivity.

Therefore, it is possible to form the inorganic alignment film having an excellent ability for regulating the degree of alignment of the liquid crystal molecules.

As shown in FIG. 3, each concave portion 31 is divided into a concave portion 31a and a concave portion 31b having a depth lower than the depth of the concave portion 31a. Similarly, each concave portion 41 is divided into a concave portion 41a and a concave portion 41b having a depth lower than the depth of the concave portion 41a.

Since the concave portions 31 and 41 have almost the same shape, hereinafter, the concave portion 31 will be representatively described.

The concave portion 31a is formed at a position substantially corresponding to a concave portion 51 on the transparent conductive film 5, as described below in detail.

Further, as described above, the concave portion 31b has a depth lower and a size smaller than that of the concave portion 31a.

The liquid crystal molecules have a property wherein adjacent liquid crystal molecules have the same directivity and have a tendency wherein the degree of alignment of all of the liquid crystal increases when the liquid crystal molecules partially enter the concave portions, as described above. Particularly, in the present embodiment, since the relatively large concave portion 31a and the relatively small concave portion 31b exist, the liquid crystal molecules to enter the concave portions 31a have a directivity corresponding to the directivity of the concave portions 31a. Other liquid crystal molecules or a part of them, have the original directivity due to the concave portions 31b. With only the relatively large concave portions 31a, it may be difficult to maintain a sufficient degree of alignment of all the liquid crystal molecules. Meanwhile, like the present embodiment, if the concave portions 31b having a relatively lower depth exist, it is possible to more effectively maintain the degree of alignment of all the liquid crystal molecules.

The concave portions 31a and 31b may be provided at any positions on the surface of the inorganic alignment film 3A, and are preferably provided at random positions, as shown in FIG. 2. If the concave portions 31a and 31b are provided at random positions, as described above, it is possible to form the concave portions 31a and 31b relatively easily when the concave portions 31a and 31b are formed by a method described below in detail. Further, if the concave portions 31a and 31b are provided at random positions, alignment of the liquid crystal molecules in the vertical direction of the drawing in FIG. 3 is suppressed, as compared with the case where the concave portions 31a and 31b are regularly formed, for example, when each concave portion has a recess shape and is formed over substantially the full length in the widthwise direction of the base substrate 100, whereby the concave portions are arranged at regular intervals (for example, like a washboard). As a result, it is possible to make the degree of alignment of the liquid crystal molecules better as a whole.

In a portion in which the concave portion 31a of the inorganic alignment film 3A is formed, a surface (an inclined surface 32a) inclined at an angle of $\theta_c$ with respect to a direction parallel to the surface of the substrate 9 exists, as shown in FIG. 3. Similarly, in a portion in which the concave portion 31b of the inorganic alignment film 3A is formed, a surface (an inclined surface 32b) inclined at an angle of $\theta_d$ exists. Thus, it is possible to more effectively form a suitable pretilt angle.

The inclination angle $\theta_c$ of the inclined surface 32a is not specifically limited, but it is preferably, 2° to 45°, and more preferably, 2° to 10°. Thus, it is possible to more effectively form a suitable pretilt angle.

The inclination angle $\theta_d$ of the inclined surface 32b is not specifically limited, but it is preferably, 2° to 45°, and more preferably, 2° to 10°. Thus, it is possible to more effectively form a suitable pretilt angle.

Further, as shown in FIG. 2, inclination directions of the inclined surfaces 32a and 32b are substantially arranged in order on the inorganic alignment film 3A. Thus, each concave portion has a predetermined directivity. As a result, it is possible to regulate the degree of alignment of the liquid crystal molecules more effectively.

Further, as seen from a plan view of the upper portion of FIG. 3, an average width (average of the maximum width) $W_1$ of the concave portions 31a in the inclination direction of the inclined surface is preferably 5 to 500 nm, and more preferably, 8 to 20 nm. Thus, it is possible to maintain a sufficient degree of alignment of the liquid crystal molecules.

Further, as seen from a plan view of the upper portion of FIG. 3, an average width (average of the maximum width)

$W_2$ of the concave portions 31b in the inclination direction of the inclined surface is preferably 5 to 500 nm, and more preferably, 8 to 20 nm. Thus, it is possible to maintain a sufficient degree of alignment of the liquid crystal molecules.

Further, as seen from a plan view of the upper portion of FIG. 3, an average width (average of the maximum width) $W_3$ of the concave portion 31a in a direction orthogonal to the inclination direction is preferably 5 to 500 nm, and more preferably, 8 to 20 nm. Thus, it is possible to further improve the degree of alignment of the liquid crystal molecules. On the contrary, if the width $W_3$ is too small, it may be difficult to control the alignment state (the pretilt angle) of the liquid crystal molecules when a voltage is not applied. Meanwhile, if the width $W_3$ is too large, it may be difficult to align the liquid crystal molecules in a predetermined direction.

Further, as seen from plan view of the upper portion of FIG. 3, an average width (average of the maximum width) $W_4$ of the concave portion 31b in a direction orthogonal to the inclination direction of the inclined surface is preferably 5 to 500 nm, and more preferably, 8 to 20 nm. Thus, it is possible to improve the degree of alignment of the liquid crystal molecules. On the contrary, if the width $W_4$ is too small, it may be difficult to control the alignment state (the pretilt angle) of the liquid crystal molecules when a voltage is not applied. Meanwhile, if the width $W_4$ is too large, it may be difficult to align the liquid crystal molecules in a predetermined direction.

The inorganic alignment films 3A and 4A are substantially made of an inorganic material. Since the inorganic material generally has excellent chemical stability as compared with an organic material, the inorganic alignment films 3A and 4A have excellent light resistance as compared with an alignment film made of the organic material.

As the inorganic material described above, for example, silicon oxide such as $SiO_2$ and SiO, or metallic oxide such as MgO and ITO can be used. Among these, in particular, it is preferable to use silicon oxide. Thus, it is possible to allow the resulting liquid crystal panels to have more excellent light resistance.

The average thickness of such an inorganic alignment film 3A or 4A is preferably 0.02 to 0.3 μm, and more preferably, 0.02 to 0.08 μm. If the average thickness is less than such a lower limit value, it may be difficult to make the pretilt angle in each portion sufficiently uniform. Meanwhile, if the average thickness exceeds such an upper limit value, the driving voltage may rise, and thus the power consumption may increase.

Moreover, in the present embodiment, the inorganic alignment film having the concave portions at random positions on the surface thereof is described, but the inorganic alignment film may have the concave portions at regular positions on the surface thereof.

On an outer surface of the inorganic alignment film 3A (a surface opposite to a surface facing the liquid crystal layer 2), the transparent conductive film 5 is arranged. Similarly, on an outer surface of the inorganic alignment film 4A (a surface opposite to a surface facing the liquid crystal layer 2), the transparent conductive film 6 is arranged.

The transparent conductive films 5 and 6 have a function for driving (changing the alignment of) the liquid crystal molecules of the liquid crystal layer 2 when an electrical conduction exists (current flows) between the transparent conductive films 5 and 6.

Control of the electrical conduction between the transparent conductive films 5 and 6 is performed by controlling a current to be supplied from a control circuit (not shown) which is connected to the transparent conductive films.

The transparent conductive films 5 and 6 have a conductive property, and are made of, for example, indium tin oxide (ITO), indium oxide (IO), tin oxide ($SnO_2$) or the like.

On an outer surface of the transparent conductive film 5 (a surface opposite to a surface facing the inorganic alignment film 3A), the substrate 9 is arranged. Similarly, On an outer surface of the transparent conductive film 6 (a surface opposite to a surface facing the inorganic alignment film 4A), the substrate 10 is arranged.

As shown in FIG. 3, the transparent conductive film 5 has a plurality of concave portions 51 having a predetermined directivity on a surface which contacts the inorganic alignment film 3A. Similarly, the transparent substrate 6 has also a plurality of concave portions 61 having a predetermined directivity at random positions on a surface which contacts the inorganic alignment film 4A. Thus, it is possible to improve adhesion to the above-mentioned inorganic alignment film, and further, by a method described below, it is possible to form suitable concave portions on the film made substantially of the inorganic material. As a result, it is possible to form an inorganic alignment film having an excellent ability for regulating the degree of alignment of the liquid crystal molecules.

Since the concave portions 51 and 61 have almost the same shape, and hereinafter, the concave portions 51 will be representatively described.

As shown in FIG. 2, in a portion at which the concave portion 51 of the transparent conductive film 5 is formed, a surface (an inclined surface 52) inclined at an angle of $\theta_e$ with respect to a direction parallel to a surface of the substrate 9 exists. Thus, it is possible to more effectively form an inorganic alignment film capable of forming a suitable pretilt angle.

Further, the inclination direction of the inclined surface 52 is substantially aligned on the respective transparent conductive films, as shown in FIG. 3. Thus, it is possible to allow the respective concave portions to have a predetermined directivity. As a result, it is possible to more effectively form an inorganic alignment film capable of aligning the liquid crystal molecules in a predetermined direction.

The inclination angle $\theta_e$ of the inclined surface 52 is not specifically limited, but it is preferably 2° to 45°, and more preferably, 2° to 10°. Thus, it is possible to more effectively form an inorganic alignment film capable of allowing a suitable pretilt angle.

Further, as seen from a plan view of the upper portion of FIG. 2, an average width (average of the maximum width) $W_5$ of the concave portions 51 and 61 in the inclination direction of the inclined surface is preferably 5 to 500 nm, and more preferably, 8 to 20 nm. Thus, it is possible to more effectively form an inorganic alignment film capable of effectively regulating the degree of alignment of the liquid crystal molecules.

Further, as seen from a plan view of the upper portion of FIG. 2, an average width (average of the maximum width) $W_6$ of the concave portions 51 and 61 in a direction orthogonal to the inclination direction of the inclined surface is preferably 5 to 500 nm, and more preferably, 8 to 20 nm. Thus, it is possible to more effectively form an inorganic alignment film capable of aligning the liquid crystal molecules in a predetermined direction. On the contrary, if the width $W_6$ is too small, it may be difficult to control the alignment state (the pretilt angle) of the liquid crystal molecules when a voltage is not applied. Meanwhile, if the width $W_6$ is too large, it may be difficult to form an inorganic alignment film capable of aligning the liquid crystal molecules in a predetermined direction.

The substrates 9 and 10 have a function for supporting the above-mentioned liquid crystal layer 2, the inorganic alignment films 3A and 4A, the transparent conductive films 5 and 6, and the polarizing films 7A and 8A described below. The material of the substrates 9 and 10 is not specifically limited, but it may include a glass material such as quartz glass or a plastic material such as polyethyleneterephthalate. Among these, it is preferable to use a glass material such as quartz glass. Thus, it is possible to obtain a liquid crystal panel having excellent stability in which curving or bending almost never occurs. In FIG. 1, a sealing material, wiring lines and so on are omitted.

On an outer surface of the substrate 9 (a surface opposite to a surface facing the transparent conductive film 5), the polarizing film (a polarizing plate, a polarizing film) 7A is arranged. Similarly, on an outer surface of the substrate 10 (a surface opposite to a surface facing the transparent conductive film 6), the polarizing film (a polarizing plate, a polarizing film) 8A is arranged.

The material of the polarizing films 7A and 8A may include, for example, polyvinylalcohol (PVA). Further, as the polarizing film, a material with iodine doped into the above-mentioned material may be used.

As the polarizing film, a film, for example, made of the above-mentioned material and extended in one axis direction may be used.

By arranging such polarizing films 7A and 8A, it is possible to more effectively control light transmittance by adjusting the amount of electrical conduction.

The directions of the polarizing axes of the polarizing films 7A and 8A are normally determined by the alignment directions of the inorganic alignment films 3A and 4A.

Next, an example of the method of forming an inorganic alignment film according to the present will be described.

The method of forming an inorganic alignment film according to the present comprises a first milling step as described below, a film-forming step, and a second milling step. Thus, it is possible to obtain an inorganic alignment film having excellent light resistance and capable of effectively controlling the pretilt angle.

FIG. 4 is a view for explaining the method of forming an inorganic alignment film according to the present invention.

Hereinafter, only a case of forming the inorganic alignment film 3A on the base substrate 100 will be described, but the inorganic alignment film 4A can also be formed similarly.

First Milling Step (First Milling Process)

In the present step, a plurality of concave portions 51 having a predetermined directivity are formed on the base substrate 100 (the transparent conductive film 5) (see FIGS. 4(*a*) and 4(*b*)).

Figure 5:
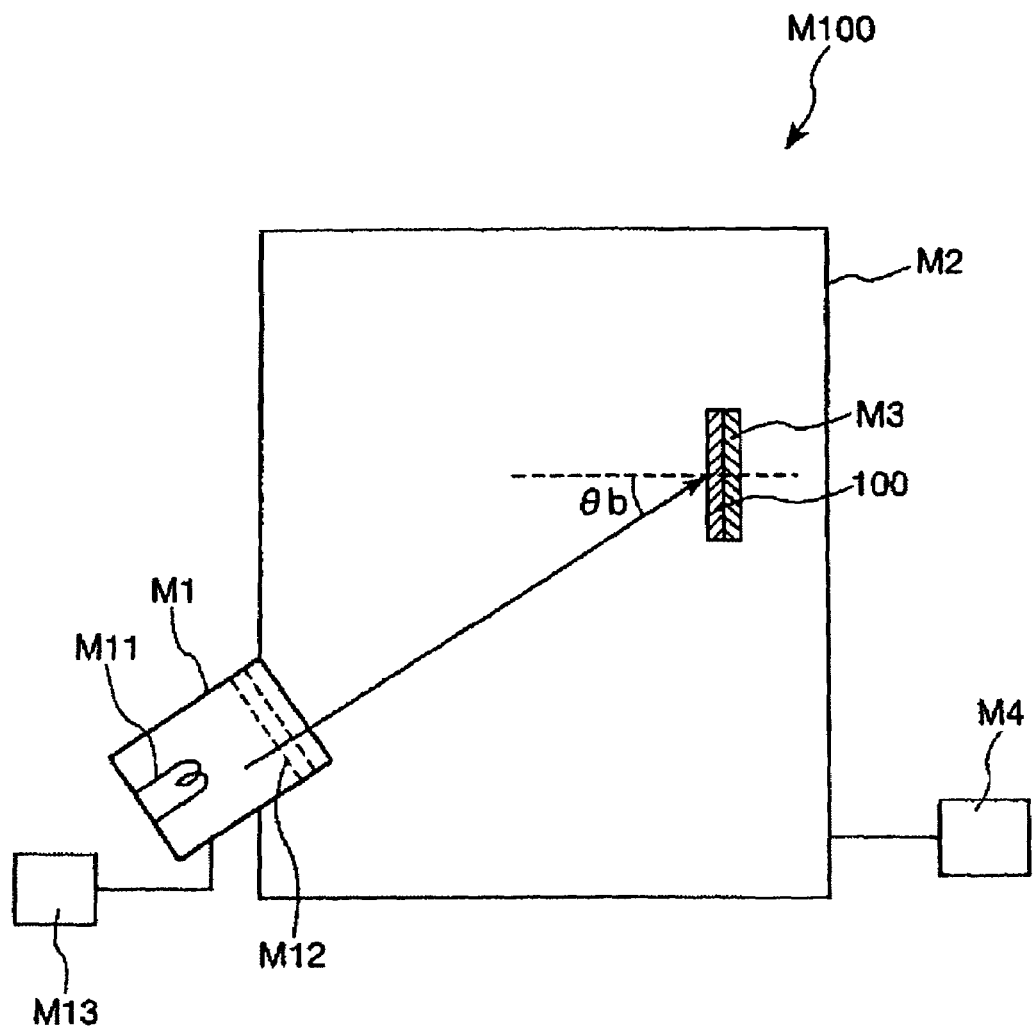
FIG. 5 is a schematic view of a milling device which is used to form concave portions.

FIG. 5 is a schematic view of a milling device which is used to form the concave portions on the base substrate.

The milling device M100 shown in FIG. 5 has an ion source M1 for irradiating ion beams, a vacuum chamber M2, a base substrate holder M3 for fixing the base substrate into the vacuum chamber M2, and an air-discharging pump M4 for controlling the pressure within the vacuum chamber M2.

The ion source M1 has a filament M11 therein, and a leading-out electrode M12. Further, the ion source M1 is connected to a gas supply source M13 for supplying gas in the ion source M1.

A case of forming the concave portions 51 on the base substrate 100 using such a milling device will now be schematically described.

1. On the base substrate holder M3, the base substrate 100 is provided such that the substrate 9 contacts the base substrate holder M3.

2. The pressure within the vacuum chamber M2 is reduced by the air-discharging pump M4.

3. Gas is supplied from the gas supply source M13 into the ion source M1.

4. A voltage is applied to the filament M11 from a power source (not shown), such that hot electrons are generated.

5. The generated hot electrons collide against the introduced gas, and the gas is ionized, such that plasma (ions) is generated.

6. An ion acceleration voltage is applied to the leading-out electrode M12, and the ions are accelerated such that ion beams are irradiated toward the base substrate 100.

7. The irradiated ion beams collide against the base substrate 100 (the transparent conductive film 5) from a direction inclined at an angle of $\theta_a$ with respect to a direction orthogonal to a surface of the base substrate 100 on which the inorganic alignment film 3A is formed.

8. At portions on the base substrate 100 (transparent conductive film 5) to which the ion beams are irradiated, the concave portions 51 are formed.

Moreover, the base substrate holder M3 is moved or rotated in advance such that the ion beams irradiated from the ion source M1 collide against the surface of the base substrate 100 on which the inorganic alignment film 3A is formed from a direction inclined at a predetermined angle (a collision angle) $\theta_a$ with respect to a direction orthogonal to the surface. Alternatively, the base substrate holder M3 may be moved or rotated by the collision angle $\theta_a$ while the ion beams are irradiated.

In such a method of forming an inorganic alignment film according to the present invention, in the first milling step, the ion beams are irradiated to the surface of the base substrate on which the inorganic alignment film is to be formed from a direction inclined at the predetermined angle (the collision angle) $\theta_a$ with respect to the direction orthogonal to the surface. Thus, it is possible to more efficiently form the concave portions 51 having a predetermined directivity, as described above. As a result, the resulting inorganic alignment film 3A can allow a suitable pretilt angle to be formed.

The collision angle $\theta_a$ is not specifically limited, but it is preferably 2° or more, more preferably, 45° or more, and still more preferably, 70° to 88°. Thus, the above-mentioned effects become more remarkable. On the contrary, if the collision angle $\theta_a$ is too small, it may be difficult to align the directivity of the concave portions 51 formed. Meanwhile, if the collision angle $\theta_a$ is too large, the efficiency for forming the concave portions 51 may be lowered, and further it may be difficult to sufficiently increase the degree of alignment of the resulting inorganic alignment film 3A. Furthermore, it may be difficult to form a relatively large pretilt angle.

In the present step, the current of the ion beams irradiated is preferably 100 to 1000 mA, and more preferably, 250 to 800 mA. Thus, it is possible to more efficiently form a plurality of concave portions 51 at random positions on the base substrate 100. As a result, it is possible to improve the ability for regulating 3A the degree of alignment of the liquid crystal molecules of the inorganic alignment film. On the contrary, if the ion beam current is less than the above-mentioned upper limit value, it may be difficult to sufficiently form the plurality of concave portions 51, depending on the acceleration voltage or the irradiation time of the ion beams. Further, if the ion beam current exceeds the above-mentioned upper limit value, adjacent concave portions 51 may be bonded together, depending on the acceleration voltage or the irradiation time of the ion beams. As a result, this is likely to result in ability to regulate the degree of alignment of the liquid crystal molecules of the resulting inorganic alignment film 3A to be lowered.

The acceleration voltage of the ion beams is preferably 400 to 1400 V, and more preferably, 600 to 1000 V. Thus, it is possible to more efficiently form the concave portions 51 each having a suitable inclined surface. On the contrary, if the acceleration voltage is less than the above-mentioned lower limit value, the concave portions 51 may not have a sufficient size. Further, if the acceleration voltage exceeds the above-mentioned upper limit value, it may be difficult to control the shapes of the concave portions 51.

The pressure within the vacuum chamber M2, that is, the pressure of an atmosphere in the vicinity of the base substrate 100 in the present step, is preferably $5.0 \times 10^{-1}$ Pa, and more preferably, $5.0 \times 10^{-2}$ Pa or less. Thus, it is possible to improve the rectilinearity of the ion beams, and further it is possible to more efficiently form the concave portions 51 each having an inclined surface of a suitable angle. On the contrary, if the pressure of the atmosphere exceeds the above-mentioned upper limit value, the rectilinearity of the ion beams may be lowered. Further, it may be difficult to control the shapes of the concave portions 51 to be formed.

In the above description, only a case of forming the concave portions 51 in the base substrate 100 is described, but the concave portions 61 can also be formed similarly.

Film-Forming Step

Figure 4A:
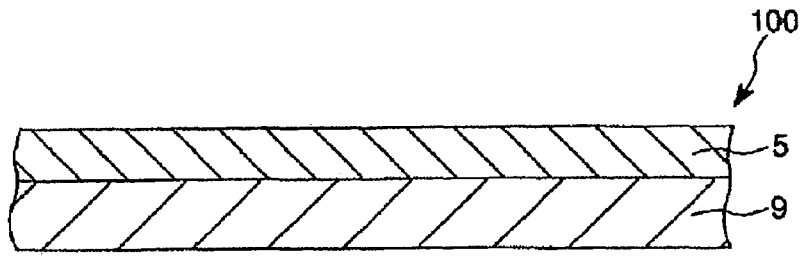
FIG. 4($a$)-($d$) are views for explaining a method of forming an inorganic alignment film according to the present invention.
Figure 4B:
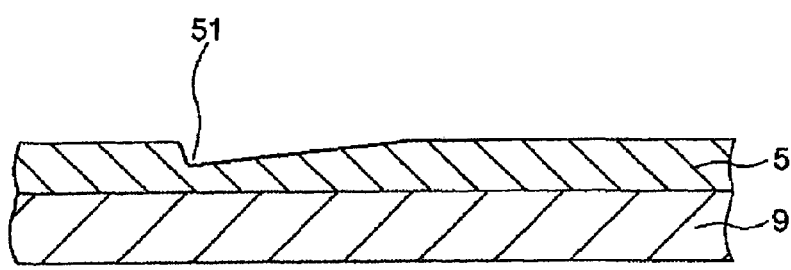
Figure 4C:
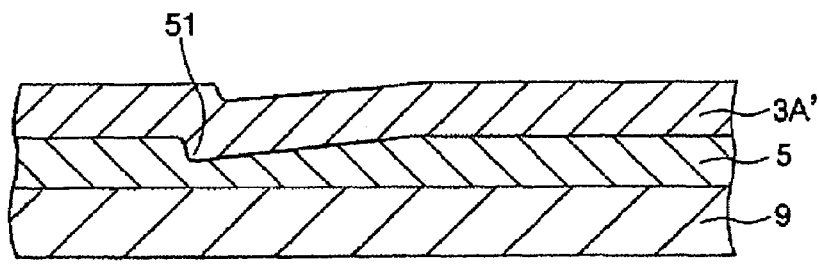

In the present step, on the base substrate 100 (the transparent conductive film 5) in which the concave portions 51 are formed, a film 3A' made substantially of the above mentioned inorganic material is formed (see FIG. 4(c)).

A method for forming the film 3A' on the base substrate 100 is not specifically limited, but any one of a sputtering method (for example, a magnetron sputtering method, an ion beam sputtering method, or the like), a vapor deposition method, a sol-gel method, a self-organizing method, and so on may be used. Among these, it is particularly preferable to use the sputtering method. Thus, it is possible to more efficiently form the film 3A'.

Hereinafter, a case in which the ion beam sputtering method is used as an example will be described.

Figure 6:
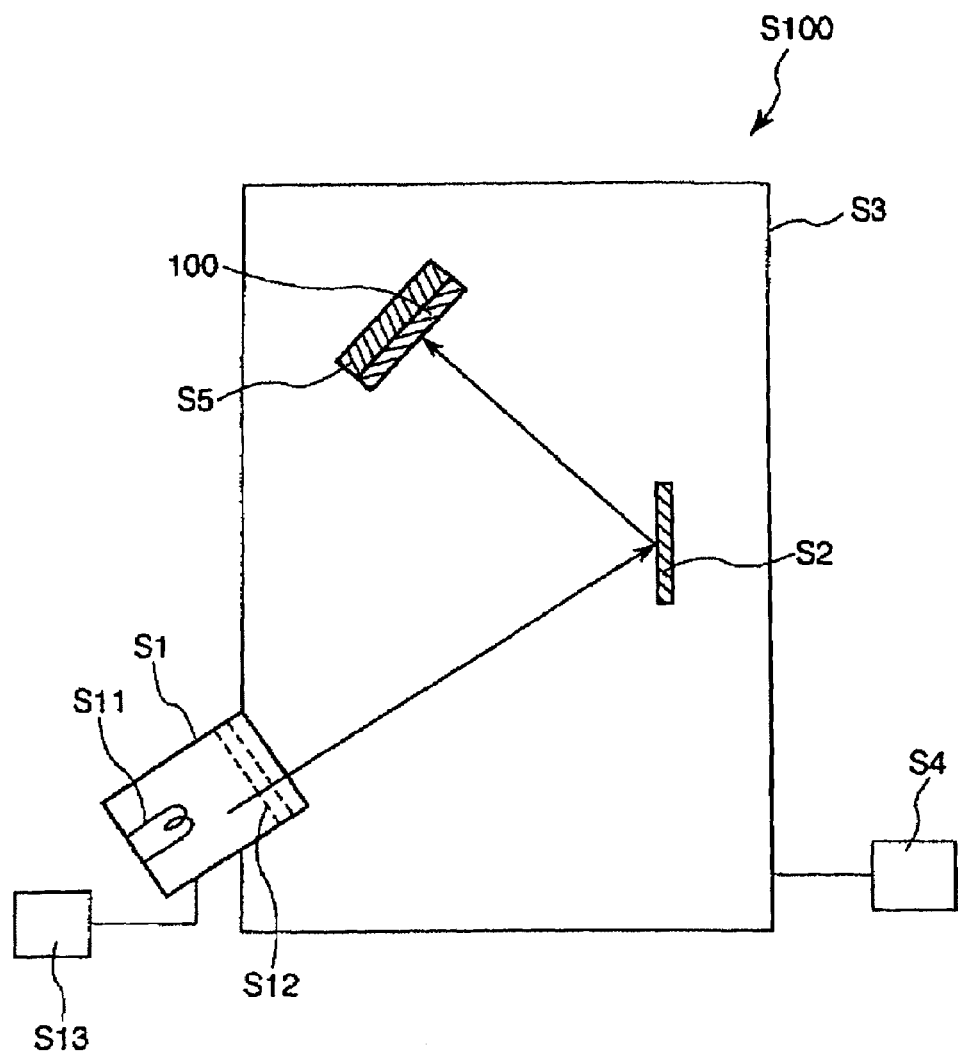
FIG. 6 is a schematic view of an ion beam sputtering device for forming a film.

FIG. 6 is a schematic diagram of an ion beam sputtering device for forming the film.

The ion beam sputtering device S100 shown in FIG. 6 has an ion source S1 for irradiating ion beams, a target S2 for generating (irradiating) sputter particles by the irradiation of the ion beams, a vacuum chamber S3, an air-discharging pump S4 for controlling the pressure within the vacuum chamber S3, and a base substrate holder S5 for fixing the base substrate with the inorganic alignment film formed thereon in the vacuum chamber S3.

The ion source S1 has a filament S11 therein, and a leading-out electrode S12. Further, to the ion source S1, a gas supply source S13 for supplying gas into the ion source S1 is connected.

A case in which the film 3A' is formed using such an ion beam sputtering device will now be schematically described.

1. The base substrate 100 is provided in the base substrate holder S5 in the vacuum chamber S3.

2. The pressure within the vacuum chamber S3 is reduced by the air-discharging pump S4.

3. Gas is supplied from the gas supply source S13 into the ion source S1.

4. A voltage is applied to the filament S11 from a power source (not shown), such that hot electrons are generated.

5. The generated hot electrons collide against the introduced gas, and the gas is ionized, such that plasma (ions) is generated.

6. An ion acceleration voltage is applied to the leading-out electrode S12, and the ions are accelerated and irradiated on the target S2 as the ion beams.

7. The target S2 on which the ion beams are irradiated irradiates sputter particles toward the base substrate 100, such that a substrate in which the film 3A' is formed on the base substrate 100 is obtained.

The pressure within the vacuum chamber S3, that is, the pressure of an atmosphere when the film 3A' is formed is preferably $5.0 \times 10^{-1}$ Pa or less, and more preferably, $1.0 \times 10^{-1}$ Pa or less. Thus, it is possible to more efficiently form the film 3A'. If the pressure within the vacuum chamber S3 is too high, it is likely to cause the rectilinearity of the irradiated sputter particles to be lowered. As a result, a sufficiently uniform film may not be formed.

The acceleration voltage to be applied to the leading-out electrode S12 is not specifically limited, but it is preferably 400 to 1400 V, and more preferably 800 to 1200 V. Thus, it is possible to more efficiently form the film 3A'. On the contrary, if the ion acceleration voltage is less than the above-mentioned lower limit value, the sputter rate may be lowered, and sufficient productivity may not be obtained. Meanwhile, if the acceleration voltage exceeds the above-mentioned upper limit value, a sufficiently uniform film may not be formed.

The temperature of the base substrate 100 is preferably 150° C. or less, more preferably 100° C. or less, and still more preferably 80 to 50° C. Thus, it is possible to suppress a phenomenon whereby the sputter particles attached to the base substrate 100 move from their originally attached positions, that is, migration, and thus it is possible to further improve the ability to regulate the degree of alignment of the liquid crystal molecules of the resulting inorganic alignment film 3A. Moreover, if necessary, the base substrate 100 may be cooled such that the temperature of the base substrate 100 during the formation of the film 3A' falls within the above-mentioned range.

The gas to be supplied from the gas supply source S13 into the ion source S1 is not specifically limited, but it is preferably a noble gas, and furthermore, among these, it is particularly preferable to use argon gas. Thus, it is possible to improve the forming speed (the sputter rate) of the film 3A'.

The material constituting the target S2 is suitably selected according to the material for forming the film 3A'. For example, in the case in which an inorganic alignment film made of $SiO_2$ is formed, a target S2 made of $SiO_2$ may be used, and in the case in which the inorganic alignment film made of SiO is formed, a target S2 made of SiO may be used.

Second Milling Step (Second Milling Process)

Figure 4D:
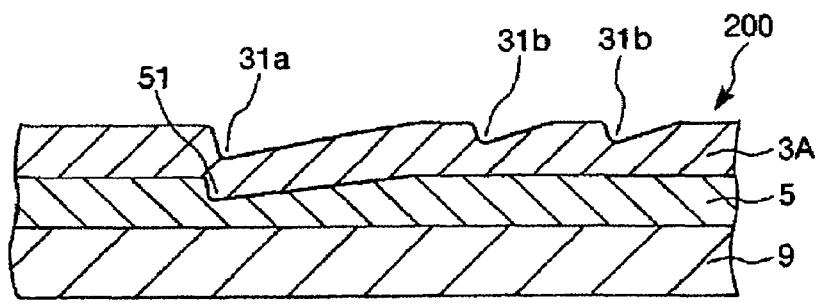

In the present step, using the milling device (see FIG. 5) used in the first milling step, as shown in FIG. 4(d), a plurality of concave portions 31a and 31b having a predetermined directivity are formed on the film 3A' obtained in the above-mentioned film-forming step.

A case of forming the concave portions 31a and 31b on the film 3A' using the milling device as shown in FIG. 5 will now be schematically described.

1. In the base substrate holder M3, the base substrate 100 on which the film 3A' is formed is provided such that the substrate 9 contacts the base substrate holder M3.

2. The pressure within the vacuum chamber M2 is reduced by the air-discharging pump M4.

3. Gas is supplied from the gas supply source M13 into the ion source M1.

4. A voltage is applied to the filament M11 from a power source (not shown), such that hot electrons are generated.

5. The generated hot electrons collide against the introduced gas, and the gas is ionized, such that plasma (ions) is generated.

6. An ion acceleration voltage is applied to the leading-out electrode M12, and the ions are accelerated, such that ion beams are irradiated toward the film 3A' formed on the base substrate 100.

7. The irradiated ion beams collide against the film 3A' from a direction inclined at an angle of $\theta_b$ with respect to a direction orthogonal to a surface of the base substrate 100 on which the film 3A' is formed.

8. In portions on the film 3A' to which the ion beams are irradiated, the concave portions 31 are formed, and the inorganic alignment film 3A is formed on the base substrate 100.

Moreover, the base substrate holder M3 is moved or rotated in advance such that the ion beams irradiated from the ion source M1 collide against the surface of the film 3A' formed on the base substrate 100 from a direction inclined at a predetermined angle (a collision angle) $\theta_b$ with respect to a direction orthogonal to the surface. Alternatively, the base substrate holder M3 may be moved or rotated by the collision angle $\theta_b$ while the ion beams are irradiated.

As described above, in the method of forming an inorganic alignment film according to the present invention, in the second milling step, the ion beams are irradiated to the surface of the film, which has a surface shape substantially corresponding to the surface shape of the transparent conductive film and is made substantially of the inorganic material, from a direction inclined at the predetermined angle (the collision angle) $\theta_b$ with respect to a direction orthogonal to the base substrate. That is, the method of forming an inorganic alignment film according to the present invention performs the milling step (the irradiation of the ion beams) on the base substrate, forms the film made substantially of the inorganic material on the base substrate, and then performs the milling step on the surface of the film again. Thus, it is possible to form suitable uniform concave portions over substantially the entire surface of the inorganic alignment film. More specifically, as shown in FIG. 4(d), it is possible to form relatively deep concave portions and relatively shallow concave portions. As a result, it is possible to increase the degree of alignment of the liquid crystal molecules, and further it is possible to effectively control the pretilt angle.

As shown FIG. 4(c), though the second milling step is not performed, the portions corresponding to the concave portions 51 of the base substrate 100 (the transparent conductive film 5) on the film 3A' normally become the concave portions. However, with only such concave portions, it becomes difficult to maintain a sufficient degree of alignment of the liquid crystal molecules. That is, in the case in which the second milling step is not performed, it is impossible to obtain a sufficient degree of alignment of the liquid crystal molecules, and further it is impossible to obtain a suitable pretilt angle. Like the present invention, by performing the milling step (the irradiation of the ion beams) twice, for example, it is possible to fix the original shapes of the concave portions on the film 3A', that is, to form the concave portions 31a, and further, it is possible to form the relatively shallow concave portions 31b. As a result, it is possible to increase the degree of alignment of the liquid crystal molecules. In addition, it becomes possible to reliably obtain a suitable pretilt angle. Meanwhile, in the case in which the concave portions generating the suitable pretilt angle are obtained by performing the milling step only on the transparent conductive film 5, considerations may be given to, for example, extending the irradiation time of the ion beams and increasing the intensity (the acceleration voltage) of the ion beams. However, in this case, substantially the entire surface of the transparent conductive film 5 is removed, and thus it may be more difficult to form the concave portions.

Further, in the case in which the first milling step is not performed, that is, the milling step is performed only on the film 3A' and not on the transparent conductive film 5, it is also possible to form the concave portions on the surface of the film 3A'. However, with only the milling step to the film 3A', it becomes difficult to form enough concave portions to maintain the degree of alignment of the liquid crystal molecules. Further, in the case in which the concave portion generating the suitable pretilt angle is obtained with only the milling step on the film 3A', considerations may be given to, for example, extending the irradiation time of the ion beams and increasing the intensity (the acceleration voltage) of the ion beams. However, in this case, substantially the entire surface of the film 3A' is removed, and thus it may be more difficult to form the concave portions.

The collision angle $\theta_b$ of the ion beams with respect to the film 3A' is not specifically limited, but it is preferably 20° or more, more preferably 45° or more, and still more preferably 70° to 88°. Thus, it is possible to more efficiently form the concave portions 31a and 31b, for example. On the contrary, if the collision $\theta_b$ is too small, it may be difficult to align the directivity of the resulting concave portions 31a and 31b. Meanwhile, if the collision angle $\theta_b$ is too large, the efficiency of forming the concave portions 31a and 31b may be reduced. Further, the degree of alignment of the resulting inorganic alignment film 3A may not be sufficiently raised. Further, it may be difficult to make a relatively large pretilt angle.

In the present step, the current of the ion beams irradiated is preferably 100 to 1000 mA, and more preferably 50 to 800 mA. Thus, it is possible to more efficiently form a plurality of concave portions 31 at random positions on the film 3A'. As a result, it is possible to improve the ability for regulating the degree of alignment of the liquid crystal molecules of the inorganic alignment film 3A. On the contrary, if the current of the ion beams is less than the above-mentioned lower limit value, it may be difficult to form a sufficient number of the concave portions 31a and 31b, depending on the acceleration voltage or the irradiation time of the ion beams. Meanwhile, if the current of the ion beams exceeds the above-mentioned upper limit value, adjacent concave portions may be bonded together, depending on the acceleration voltage or the irradiation time of the ion beams. As a result, the ability to regulate the degree of alignment of the liquid crystal molecules of the inorganic alignment film 3A may be reduced.

The acceleration voltage of the ion beams is preferably 400 to 1400 V, and more preferably, 800 to 1200 V. Thus, it is possible to more efficiently form the concave portions 31a and 31b each having a suitable inclined surface. On the contrary, if the acceleration voltage is less than the above-mentioned lower limit value, the concave portions 31a and 31b having a sufficient size may not be formed. Meanwhile, if the acceleration voltage exceeds the above-mentioned upper limit value, it may be difficult to control the shapes of the concave portions 31a and 31b.

The pressure within the vacuum chamber M2, that is, the pressure of an atmosphere in the vicinity of the film 3A' in the present step is preferably $5.0 \times 10^{-1}$ Pa or less, and more preferably, $5.0 \times 10^{-2}$ Pa or less. Thus, it is possible to improve the rectilinearity of the ion beams, and it is possible to more efficiently form the concave portions 31a and 31b, each having an inclined surface of a suitable angle. On the contrary, if the pressure of the atmosphere exceeds the above-mentioned upper limit value, the rectilinearity of the ion beams may be reduced. Further, it may be difficult to control the shapes of the concave portions 31a and 31b to be formed.

Moreover, in the present embodiment, a case in which the sputter particles are irradiated in a direction substantially orthogonal to the base substrate 100 is described, but the sputter particles may be irradiated from an inclined direction. If the sputter particles are irradiated from the inclined direction, it is possible to achieve an additional improvement of the degree of alignment of the liquid crystal molecules, and further, it is possible to form a suitable pretilt angle.

Further, in the present embodiment, the inorganic alignment film 3A having the concave portions 31a and 31b is described. Alternatively, the original concave portions on the film 3A' may exist on the inorganic alignment film 3A as they are, or there may be substantially no concave portions 31a.

As described above, a case of forming the inorganic alignment film 3A is described, but the inorganic alignment film 4A can also be formed similarly.

Next, a second embodiment of a liquid crystal panel according to the present invention will be described.

Figure 7:
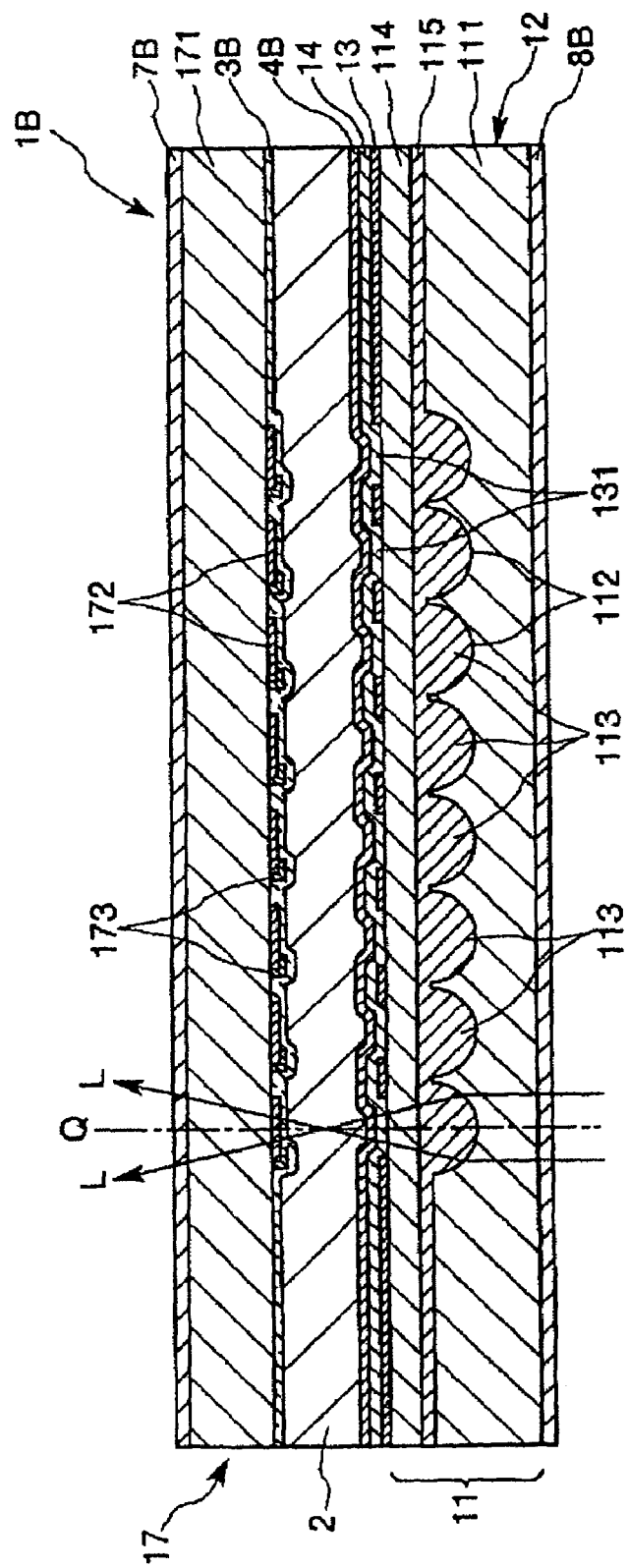
FIG. 7 is a schematic longitudinal cross-sectional view showing a second embodiment of a liquid crystal panel according to the present invention.

FIG. 7 is a schematic longitudinal cross-sectional view showing a second embodiment of a liquid crystal panel according to the present invention. Hereinafter, as regards the liquid crystal panel 1B shown in FIG. 7, differences from the first embodiment will be described, and descriptions of elements common with the first embodiment will be omitted.

As shown in FIG. 7, the liquid crystal panel (a TFT liquid crystal panel) 1B has a TFT substrate (a liquid crystal driving substrate) 17, an inorganic alignment film 3B bonded to the TFT substrate 17, a counter substrate 12 for a liquid crystal panel, an inorganic alignment film 4B bonded to the counter substrate 12 for a liquid crystal panel, a liquid crystal layer 2 made of liquid crystal which is filled into a space between the inorganic alignment film 3B and the inorganic alignment film 4B, a polarizing film 7B bonded to an outer surface of the TFT substrate (the liquid crystal driving substrate) 17 (a surface opposite to a surface facing the inorganic alignment film 3B), and a polarizing film 8B bonded to an outer surface of the counter substrate 12 for a liquid crystal panel (a surface opposite to a surface facing the inorganic alignment film 4B). The inorganic alignment films 3B and 4B are formed by the same forming method (the method of forming an inorganic alignment film according to the present invention) as that of the inorganic alignment films 3A and 4A in the above-mentioned first embodiment, and the polarizing films 7B and 8B are the same as the polarizing films 7A and 8A described in the first embodiment.

The counter substrate 12 for a liquid crystal panel has a microlens substrate 11, a black matrix 13 provided on an outer layer 114 of the microlens substrate 11, in which openings 131 are formed, and a transparent conductive film (a common electrode) 14 provided to cover the black matrix 13 on the outer layer 114.

The microlens substrate 11 has a concave portion including substrate 111 for a microlens (a first substrate) provided with plural (numerous) concave portions (concave portions for the microlenses) 112 having a concaved surface, and the outer layer (a second substrate) 114 bonded to a surface, on which the concave portions 112 of the substrate 111, via a resin layer (an adhesive layer) 115. Further, in the resin layer 115, microlenses 113 are formed by a resin filled into the concave portions 112.

The substrate 111 is made from a flat plate-shaped main material (a transparent substrate), and plural (numerous) concave portions 112 are formed on its surface. The concave portions 112 can be formed, for example, by a dry etching method, a wet etching method or the like using a mask.

The substrate 111 is made of, for example, glass.

A thermal expansion coefficient of the main material is preferably approximately equal to the thermal expansion coefficient of a glass substrate 171 (for example, a ratio of the thermal expansion coefficients is about 0.1 through 10). Thus, it is possible to prevent curving, bending, detachment or the like due to a difference of the thermal expansion coefficients when a temperature is changed in the resulting liquid crystal panel.

From this point of view, the substrate 111 and the glass substrate 171 are preferably made of the same material. Thus, it is possible to effectively prevent curving, bending, detachment or the like due to the difference of the thermal expansion coefficients during the change of temperature.

In particular, in the case in which the microlens substrate 11 is used for the TFT liquid crystal panel of high temperature polysilicon, the substrate 111 is preferably made of quartz glass. The TFT liquid crystal panel has the TFT substrate as the liquid crystal driving substrate. As such a TFT substrate, quartz glass having a property which is minimally changed by a manufacturing environment is preferably used. For this reason, in correspondence with the TFT substrate, the substrate 111 is also made of quartz glass, such that it is possible to obtain the TFT liquid crystal panel in which curving, bending or the like is unlikely and which has excellent stability.

On the upper surface of the substrate 111, a resin layer (an adhesive layer) 115 is provided to cover the concave portions 112.

By filling the material of the resin layer 115, the microlenses 113 are formed in the concave portions 112.

The resin layer 115 may be made of, for example, resin (adhesive) having a refractive index higher than the refractive index of the material of the substrate 111. For example, the resin layer 115 may be suitably made of an ultraviolet curable resin such as an acrylic resin, an epoxy resin, an acrylic epoxy resin.

On the upper surface of the resin layer 115, the flat plate-shape outer layer 114 is provided. The outer layer (a glass layer) 114 may be made of, for example, glass. In this case, the thermal expansion coefficient of the outer layer 114 is preferably approximately equal to the thermal expansion coefficient of the substrate 111. For example, a ratio of the thermal expansion coefficients is preferably about 0.1 through 10. Thus, it is possible to prevent curving, bending or the like due to the difference of the thermal expansion coefficients of the substrate 111 and the outer layer 114. Such an effect can be more effectively obtained by making the concave portion formed substrate 111 for microlens and the outer layer 114 with the same material.

From a point of view for obtaining necessary optical properties when the microlens 11 is used for a liquid crystal panel, the thickness of the outer layer 114 is normally about 5 through 1000 μm, and more preferably, 10 to 150 μm.

Moreover, the outer layer (a barrier layer) 114 may be made of, for example, ceramics. Moreover, as such ceramics, for example, nitride-based ceramics containing AlN, SiN, TiN and BN, oxide-based ceramics containing $Al_2O_3$ and $TiO_2$, and carbide-based ceramics containing WC, TiC, ZrC, TaC may be included. When the outer layer 114 is made of ceramics, the thickness of the outer layer 114 is not specifically limited, but it is preferably 20 nm through 20 μm, and more preferably, 40 nm through 1 μm.

In addition, if necessary, the outer layer 114 may be omitted.

The black matrix 13 has a light-shielding function and is made of, for example, a metallic material such Cr, Al, Al alloy, Ni, Zn, Ti and so on, or a resin in which carbon or titanium is distributed.

The transparent conductive film 14 has a conductive property and is made of, for example, indium tin oxide (ITO), indium oxide (IO), tin oxide ($SnO_2$).

The TFT substrate 17 is a substrate for driving the liquid crystal of the liquid crystal layer 2, and comprises a glass substrate 171, plural (numerous) pixel electrodes 172 provided on the glass substrate 171 and arranged in a matrix, and plural (numerous) thin film transistors (TFTs) 173 corresponding to the respective pixel electrode 172. In FIG. 7, a sealing material, wiring lines, and so on are omitted.

The glass substrate 171 is preferably made of quartz glass for the above-mentioned reason.

The pixel electrode 172 drives the liquid crystal of the liquid crystal layer 2 by charging and discharging between the transparent conductive film (the common electrode) 14 and the pixel electrode 172. The pixel electrode 172 is made of, for example, the same material as that of the above-mentioned transparent conductive film 14.

The thin film transistor 173 is connected to the nearby corresponding pixel electrode 172. Further, the thin film transistor 173 is connected to a control circuit which is not shown, and controls a current to be supplied to the pixel electrode 172. Thus, the charging and discharging of the pixel electrode 172 is controlled.

The inorganic alignment film 3B is bonded to the pixel electrodes 172 of the TFT substrate 17, and the inorganic alignment film 4B is bonded to the transparent conductive film 14 of the counter substrate 12 for a liquid crystal panel.

The liquid crystal layer 2 contains the liquid crystal molecules, and corresponding to the charging and discharging of the pixel electrode 172, the alignment of such liquid crystal molecules, that is, the liquid crystal changes.

In such a liquid crystal panel 1B, one pixel normally comprises one microlens 113, one opening 131 of the black matrix 13 corresponding to an optical axis of the microlens 113, one pixel electrode 172, and one thin film transistor 173 connected to the pixel electrode 172.

An incident light L from the counter substrate 12 for a liquid crystal panel passes through the substrate 111, is condensed while passing through the microlens 113, and transmits the resin layer 115, the outer layer 114, the opening 131 of the black matrix 13, the transparent conductive film 14, the liquid crystal layer 2, the pixel electrode 172, and the glass substrate 171. At this time, since the polarizing film 8B is provided at the incident side of the microlens substrate 11, the incident light L is linearly polarized when transmitting the liquid crystal layer 2. In this case, the polarizing direction of the incident light L is controlled corresponding to the alignment state of the liquid crystal molecules of the liquid crystal layer 2. Therefore, by allowing the incident light L transmitted the liquid crystal panel 1B to transmit the polarizing film 7B, it is possible to control the brightness of emitting light.

As described above, the liquid crystal panel 1B has the microlens 113, and additionally the incident light L passed through the microlens 113 is condensed and passes through the opening 131 of the black matrix 13. Meanwhile, in portions of the black matrix 13 at which the openings 131 are not formed the incident light L is shielded. Therefore, in the liquid crystal panel 1B, leaking of unnecessary light from portions other than the pixels is prevented, and the attenuation of the incident light L in the pixel portions is suppressed. For this reason, the liquid crystal panel 1B has high transmittance in the pixel portions.

The liquid crystal panel 1B can be manufactured, for example, by forming the inorganic alignment films 3B and 4B on the TFT substrate 17 and the counter substrate 12 for a liquid crystal panel (manufactured with a known method), respectively, joining both substrates via a sealing material (not shown), injecting liquid crystal from a filling hole (not shown) into a space defined both substrates, and then closing up the filling hole.

Moreover, in the above-mentioned liquid crystal panel 1B, the TFT substrate is used as the liquid crystal driving substrate, but liquid crystal driving substrates other than the TFT substrate, for example, a TFD substrate, an STN substrate or the like may be used for the liquid crystal driving substrate.

The liquid crystal panel comprising the above-mentioned inorganic alignment film can be suitably used for devices having an intensive light source or to be used outdoors.

Next, an electronic apparatus (a liquid crystal display device) comprising the above-mentioned liquid crystal panel 1A will be described in detail with reference to FIGS. 8 to 10.

Figure 8:
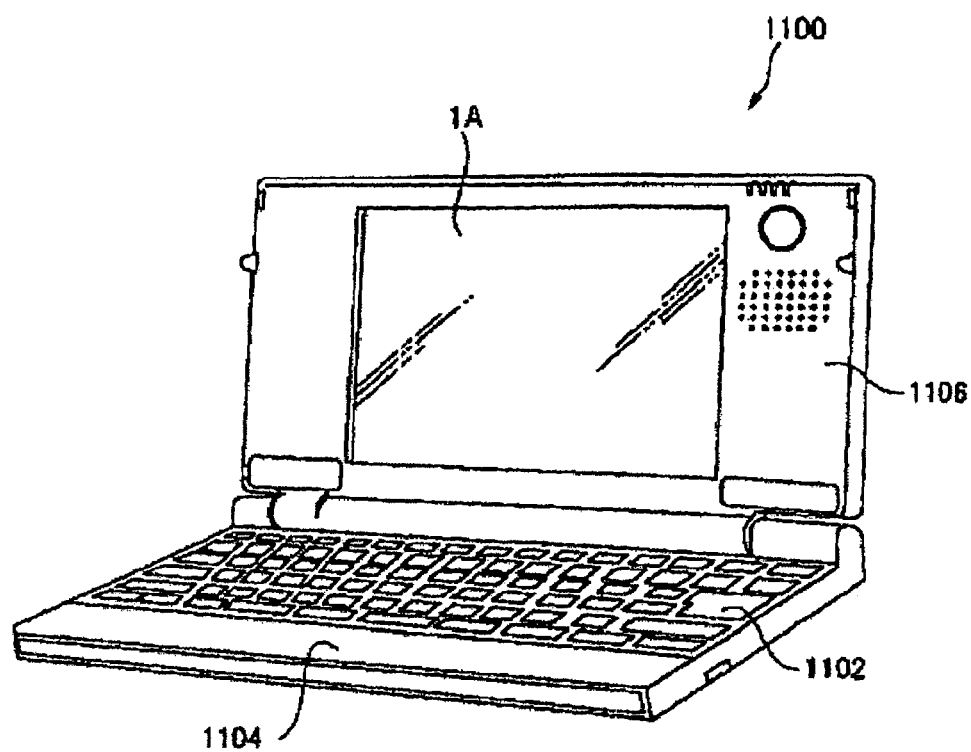
FIG. 8 is a perspective view showing a construction of a mobile or notebook personal computer to which an electronic apparatus according to the present invention is applied.

FIG. 8 is a perspective view showing a construction of a portable (notebook) personal computer to which an electronic apparatus according to the present invention is applied.

In FIG. 8, a personal computer 1100 comprises a main body portion 1104 provided with a keyboard 1102, and a display unit 1106. The display unit 1106 is rotatably supported via a hinge structure with respect to the main body portion 1104.

In the personal computer 1100, the display unit 1106 comprises the above-mentioned liquid crystal panel 1A, and a backlight which is not shown. An image (information) can be displayed by allowing light from the backlight to transmit the liquid crystal panel 1A.

Figure 9:
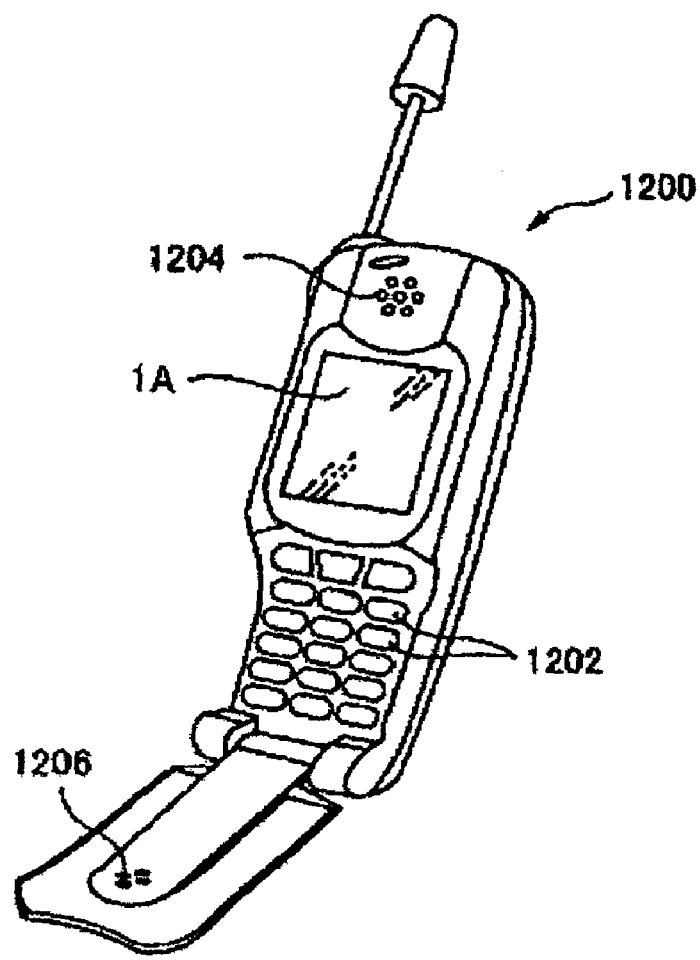
FIG. 9 is a perspective view showing a construction of a cellular phone, also including a Personal Handyphone System (PHS), to which an electronic apparatus according to the present invention is applied.

FIG. 9 is a perspective view showing a construction of a cellular phone (also including a PHS) to which an electronic apparatus according to the present invention is applied.

In FIG. 9, the cellular phone 1200 comprises a plurality of operating buttons 1202, a receiver 1204 and a transmitter 1206. In addition, the cellular phone 1200 comprises the above-mentioned liquid crystal panel 1A and a backlight which is not shown.

Figure 10:
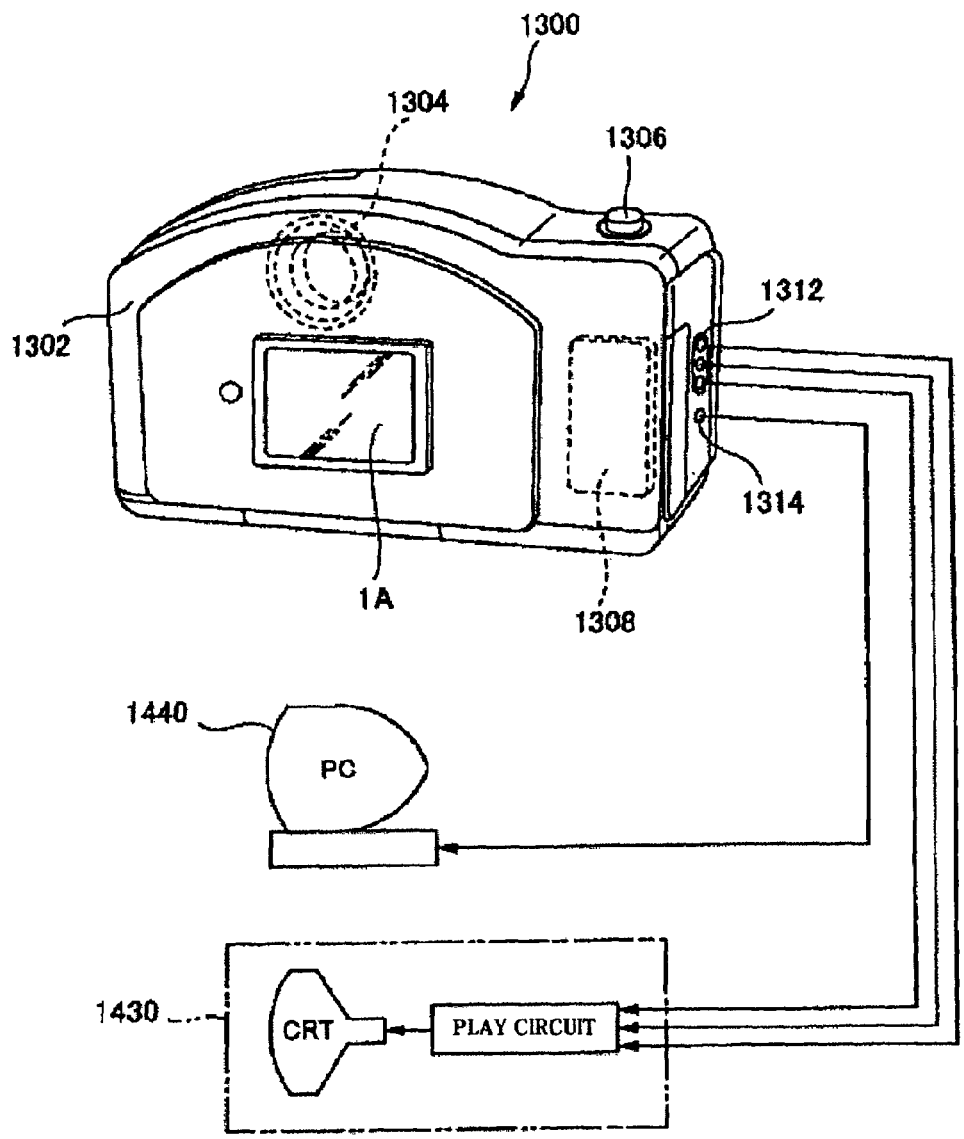
FIG. 10 is a perspective view showing a construction of a digital still camera to which an electronic apparatus according to the present invention is applied.

FIG. 10 is a perspective view showing a construction of a digital still camera to which an electronic apparatus according to the present invention is applied. Moreover, in FIG. 10, connections of the digital still camera with exterior apparatuses are simply shown.

Here, a typical camera exposes a photographic film by the optical image of a subject for photography, while the digital still camera 1300 photoelectrically converts the optical image of the subject for photography using an image pickup element such as a CCD (a charge coupled device) and generates an image pickup signal (image signal).

In the digital still camera 1300, the above-mentioned liquid crystal panel 1A and a backlight (not shown) are provided on the rear surface of a case (a body) 1302, such that a display is preformed based on the image pickup signal by the CCD. The liquid crystal panel 1A functions as a finder for displaying the subject for photography as an electronic image.

Inside the case, a circuit board 1308 is arranged. On the circuit board 1308, a memory for storing (memorizing) the image pickup signal is arranged.

Further, on a front surface of the case 1302 (a rear surface in the shown construction), a light receiving unit 1304 including an optical lens (an image pickup optical system) or the CCD is provided.

If a photographer confirms an image of the subject for photography displayed on the liquid crystal panel 1A and presses a shutter button 1306, the image pickup signal of the CCD at that point of time is transferred and stored to the memory of circuit board 1308.

Further, in the digital still camera 1300, a video signal output terminal 1312 and an input/output terminal 1314 for data communication are provided on a side surface of the case 1302.

As shown in FIG. 10, as occasion demands, a television monitor 1430 is connected to the video signal output terminal 1312, and a personal computer 1440 is connected to the input/output terminal 1314 for data communication, respectively. In addition, by a predetermined operation, the image pickup signal stored in the memory of the circuit board 1308 is outputted to the television monitor 1430 or the personal computer 1440.

Next, as an example of an electronic apparatus according to the present invention, an electronic apparatus (a liquid crystal projector) using the above-mentioned liquid crystal panel 1B will be described.

Figure 11:
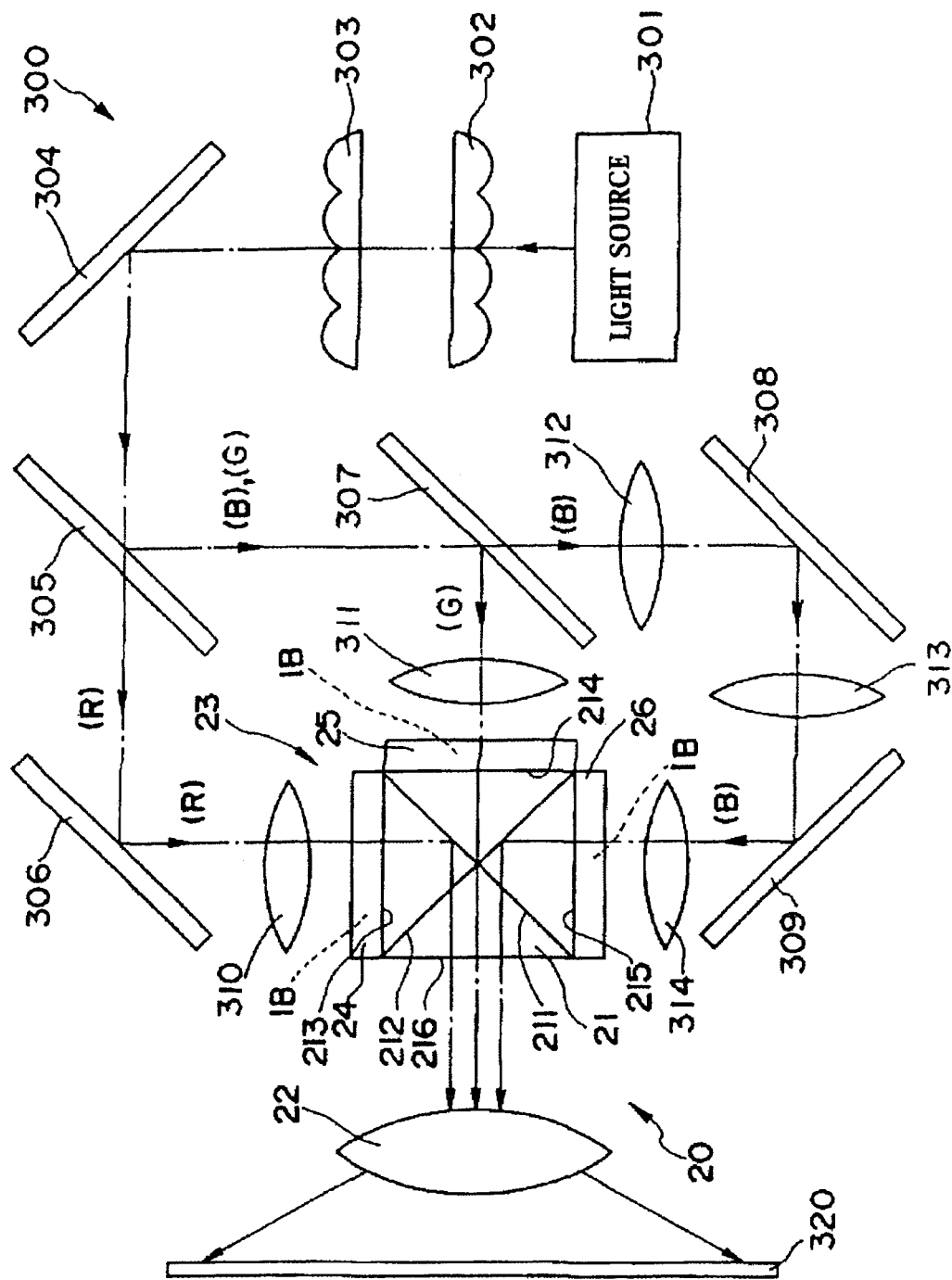
FIG. 11 is a view showing schematically an optical system of a projection display device to which an electronic apparatus according to the present invention is applied.

FIG. 11 is a view schematically showing an optical system of an electronic apparatus (a projection display device) according to the present invention.

As shown in FIG. 11, a projection display device 300 comprises a light source 301, an irradiating optical system provided with a plurality of integrator lenses, a color separating optical system (a light guiding optical system) provided with a plurality of dichroic mirrors and so on, a (red) liquid crystal light valve (a liquid crystal light shutter array) 24 corresponding to red, a (green) liquid crystal light valve (a liquid crystal light shutter array) 25 corresponding to green, a (blue) liquid crystal light valve (a liquid crystal light shutter array) 26 corresponding to blue, a dichroic prism (a color synthesizing optical system) 21 on which a dichroic mirror surface 211 reflecting only red light component and a dichroic mirror surface 212 reflecting only blue light component, and a projective lens (a projective optical system) 22.

Further, the irradiating optical system has integrator lenses 302 and 303. The color separating optical system has mirrors 304, 306 and 309, a dichroic mirror 305 for reflecting blue light component and green light component (transmitting only red light component), a dichroic mirror 307 for reflecting the green light component, a dichroic mirror 308 for reflecting only the blue light component (or a mirror reflecting the blue light component), and condensing lenses 310, 311, 312, 313 and 314.

The liquid crystal light valve 25 is provided with the above-mentioned liquid crystal panel 1B. The liquid crystal light valves 24 and 26 have the same construction as the liquid crystal light valve 25. The liquid crystal panels 1B comprised in the respective liquid crystal light valves 24, 25 and 26 are respectively connected to driving circuits which are not shown.

Moreover, in the projection display device 300, an optical block 20 is comprised of the dichroic prism 21 and the projective lens 22. Further, a display unit 23 is comprised of the optical block 20, and the liquid crystal light valves 24, 25 and 26 fixedly arranged to the dichroic prism 21.

Hereinafter, an action of the projection display device 300 will be described.

A white light component (a white light flux) emitted from the light source 301 transmits the integrator lenses 302 and 303. An optical intensity of the white light component (a brightness distribution) is equalized by the integrator lenses 302 and 303. The white light emitted from the light source 301 preferably has a relatively high optical intensity. Thus, it is possible to make an image to be formed on a screen 320 more bright. Further, since the liquid crystal panel 1B having excellent light resistance is used in the projection display device 300, it is possible to maintain stability for a long time even when the light emitted from the light source 301 has a high intensity.

The white light components transmitted the integrator lenses 302 and 303 are reflected to a left side of FIG. 11 in the mirror 304. Among the reflected light components, the blue light component (B) and the green light component (G) are respectively reflected to a lower side of FIG. 11 in the dichroic mirror 305, and the red light component (R) transmits the dichroic mirror 305.

The red light component transmitted the dichroic mirror 305 is reflected to a lower side of FIG. 11 in the mirror 306, and the reflected light is shaped by the condensing lens 310 and incident to the red liquid crystal light valve 24.

Between the blue light component and the green light component reflected in the dichroic mirror 305, the green light component is reflected to a left side of FIG. 11 in the dichroic mirror 307, and the blue light component transmits the dichroic mirror 307.

The green light component reflected in the dichroic mirror 307 is shaped by the condensing lens 311 and incident to the green liquid crystal light valve 25.

Further, the blue light component transmitted the dichroic mirror 307 is reflected to a left side of FIG. 11 in the dichroic mirror (or mirror) 308, and then the reflected light is reflected to an upper side of FIG. 11 in the mirror 309. The blue light component is shaped by the condensing lenses 312, 313 and 314 and incident to the blue liquid crystal light valve 26.

As described above, the white light component emitted from the light source 301 is separated into three primary colors of red, green and blue by the color separating optical system, and the respective separated light components are guided and incident to the corresponding liquid crystal light valve.

At this time, the respective pixels (the thin film transistors 173 and the pixel electrodes 172 connected thereto) of the liquid crystal panel 1B comprised in the liquid crystal light valve 24 are switchably controlled (on/off) by the driving circuit (driving means) which operates based on the red image signal, that is, modulated.

Similarly, the green light component and the blue light component are respectively incident to the liquid crystal light valves 25 and 26, and modulated in the respective liquid crystal panels 1B, such that the green image and the blue image are respectively formed. At this time, the respective pixels of the liquid crystal panel 1B comprised in the liquid crystal light valve 25 are switchably controlled by the driving circuit which operates based on the green image signal, and the respective pixels of the liquid crystal panel 1B comprised in the liquid crystal light valve 26 are switchably controlled by the driving circuit which operates based on the blue image signal.

Thus, the red light component, the green light component and the blue light component are respectively modulated in the liquid crystal light valves 24, 25 and 26, such that the red image, the green image and the blue image are respectively formed.

The red image formed by the above-mentioned liquid crystal light valve 24, that is, the red light component from the light crystal light valve 24 is incident to the dichroic prism 21 from a surface 213, is reflected to a left side of FIG. 11 in the dichroic mirror surface 211, transmits the dichroic mirror surface 212, and is emitted from the emitting surface 216.

Further, the green image formed by the above-mentioned liquid crystal light valve 25, that is, the green light component from the liquid crystal light valve 25 is incident to the dichroic prism 21 from a surface 214, transmits the dichroic mirror surfaces 211 and 212 respectively, and is emitted from the emitting surface 216.

Further, the blue image formed by the above-mentioned liquid crystal light valve 26, that is, the blue light component from the liquid crystal light valve 26 is incident to the dichroic prism 21 from a surface 215, is reflected to a left side of FIG. 11 in the dichroic mirror surface 212, transmits the dichroic mirror surface 211, and is emitted from the emitting surface 216.

As described above, the respective color light components from the above-mentioned liquid crystal light valves 24, 25 and 26, that is, the respective images formed by the liquid crystal light valves 24, 25 and 26 are synthesized by the dichroic prism 21, such that a color image is formed. The image is projected (magnified and projected) on the screen 320 arranged at a predetermined position by the projective lens 22.

Moreover, an electronic apparatus according to the present invention may include electronic apparatuses other than the personal computer (the portable personal computer) of FIG. 8, the cellular phone of FIG. 9, the digital still camera of FIG. 10 and the projection display device of FIG. 11. For example, a television, a video camera, a view finder type or monitor-direct-view type video tape recorder, a car navigation device, a pager, an electronic organizer (including one with a communication function), an electronic dictionary, an electronic calculator, an electronic game machine, a word processor, a video phone, a television monitor for security, electronic binoculars, a workstation, a POS terminal, an apparatus with a touch panel (for example, cash dispenser of a financial organization, an automated ticket vending machine), a medical apparatus (for example, an electronic thermometer, a sphygmomanometer, a blood sugar meter, an electrocardiogram display device, an ultrasonic diagnosis apparatus, an endoscopic display device), a fish finder, various measurement instruments, meters (for example, meters of a vehicle, an aircraft or a vessel), a flight simulator may be included. It is needless to say that the above-mentioned liquid crystal panel according to the present invention can be applied as a display unit or a monitor unit of these electronic apparatuses.

As described above, the inorganic alignment film, the substrate for electronic device, the liquid crystal panel, the electronic apparatus and the method of forming the inorganic alignment film are described based on the embodiments shown in the drawings, but the present invention is not limited to the embodiments.

For example, in the method of forming the inorganic alignment film according to the present invention, one or more processes for an optional purpose may be added. Further, in the substrate for electronic device, the liquid crystal panel and the electronic apparatus, each element may be substituted with an optional element exhibiting the same function. In addition, an optional element may be added.

Further, in the above-mentioned embodiments, a case of forming a film by applying the ion beam sputtering method is described, but a magnetron sputtering method, a long range sputtering method in which a distance between a target and a base substrate is relatively long or the like may be applied.

Further, in the above-mentioned embodiments, the projection display device (the electronic apparatus) having three liquid crystal panels to which the liquid crystal panel according to the present invention (a liquid crystal panel of which the inorganic alignment film contains an optical stabilization agent) is applied is described. However, alternatively, less than three panels may be made of the liquid crystal panel according to the present invention. In this case, the present invention is preferably applied to at least the blue liquid crystal panel.

EXAMPLES

Manufacture of Liquid Crystal Panel

As described below, the liquid crystal panel is manufactured as shown in FIG. 7.

Example 1

First, as described below, the microlens substrate is manufactured.

A non-processed quartz glass substrate (a transparent substrate) having a thickness of 1.2 mm is prepared as a parent material. Then, by dipping the substrate into a cleaning solvent (a mixture solution of sulphuric acid and oxygenated water) of 85° C., a cleaning process for cleaning the surface of the substrate is performed.

Subsequently, on the front and rear surfaces of the quartz glass substrate, a film of polycrystalline silicon having a thickness of 0.4 μm is formed by the CVD method.

Subsequently, in the formed polycrystalline silicon film, openings corresponding to the concave portions to be formed are formed.

This is preformed as follows. First, a resist layer having a pattern of the concave portions to be formed is formed on the polycrystalline silicon. Next, a dry etching by a CF gas is performed to the polycrystalline silicon to form the openings. Next, the resist layer is removed.

Next, a wet etching (at etching temperature of 30° C.) is performed by dipping the quartz glass substrate into an etching solution (a mixture aqueous solution of 10 percents by weight of fluoric acid and 10 percents by weight of glycerin for 120 minutes, such that the concave portions are formed on the quartz glass substrate.

Subsequently, by dipping the quartz glass substrate into 15 percents by weight of tetramethyl ammonium hydroxide aqueous solution for five minutes, the polycrystalline silicon film formed on the front and rear surfaces is removed, such that the concave portion including substrate for a microlens is obtained.

Next, on a surface of the concave portion including substrate for a microlens on which the concave portions are formed, an ultraviolet (UV) curable acrylic optical adhesive (a refractive index of 1.60) is coated with no bubble. Subsequently, a cover glass (an outer layer) of quartz glass is bonded to the optical adhesive, and then the optical adhesive is cured by an irradiation of ultraviolet rays, such that a laminated structure is obtained.

Subsequently, by removing and polishing the cover glass to a thickness of 50 μm, the microlens substrate is obtained.

Moreover, in the obtained microlens substrate, the thickness of the resin layer is 12 μm.

To the obtained microlens substrate, the light-shielding film (Cr film) having a thickness of 0.16 μm, that is, a black matrix is formed using the sputtering method and the photolithography method, the light-shielding layer being provided with openings at positions corresponding to the microlenses of the cover glass. In addition, the ITO film (the transparent conductive film) having a thickness of 15 μm is formed on the black matrix by the sputtering method, such that the counter substrate (the base substrate) for liquid crystal panel is manufactured.

Next, the inorganic alignment film is formed through a first. milling step, a film-forming step and a second milling step as described below.

First Milling Step

On the surface of the transparent conductive film of the obtained counter substrate for liquid crystal panel, the concave portions are formed using the milling device M100 shown in FIG. 5 as described below.

First, in the base substrate holder M3 within the vacuum chamber M2, the counter substrate for liquid crystal panel is provided, and the pressure within the vacuum chamber M2 is reduced to $1 \times 10^{-4}$ Pa using the air-discharging pump M4.

Next, argon gas is injected into the ion source M1 by the gas supply source M13, and a voltage is applied to the filament M11, such that plasmas are generated. Then, an ion acceleration voltage of 1000 V is applied to the leading-out electrode M12, and ions are accelerated, such that ions are irradiated to the counter substrate for liquid crystal panel as ion beams. Moreover, a collision angle $\theta_a$ of the ion beams against the counter substrate for liquid crystal panel is 3°.

Moreover, the inclination angle $\theta_e$ of each of the inclined surfaces of the concave portions 51 formed on the counter substrate for liquid crystal panel is 5°. In addition, the average width $W_5$ of the concave portion 51 in an inclination direction of the inclined surface of the concave portion is 10 nm, and the average width $W_6$ of the concave portion 51 in a direction orthogonal to the inclination direction is 15 nm. Further, an ion beam current is 300 mA.

Film-Forming Step

On the transparent conductive film of the counter substrate for liquid crystal panel obtained in the first milling step, a film made of an inorganic material ($SiO_2$) is formed using the device shown in FIG. 6 as described below.

First, the counter substrate for the liquid crystal panel is provided in the base substrate holder S5 within the vacuum chamber S3, and a pressure of the vacuum chamber S3 is reduced to $1 \times 10^{-4}$ Pa by the air-discharging pump S4.

Next, argon gas is supplied from the gas supply source S13 into the ion source S1, and a voltage is applied to the filament S11, such that plasmas (ions) are generated. Then, an ion acceleration voltage of 800 V is applied to the leading-out electrode S12, and the ions are accelerated, such that the ions are irradiated to the target S2 as the ion beams. Moreover, as the target S2, $SiO_2$ is used.

When the ion beams is irradiated, the target S2 irradiated sputter particles toward the counter substrate for liquid crystal panel, such that the film made of $SiO_2$ having the average thickness of 0.05 μm is formed on the transparent conductive film. Moreover, when forming the film, a temperature of the counter substrate for liquid crystal panel is 85° C.

Further, on the surface of the TFT substrate (the quartz glass) separately prepared, a film is also formed similarly to the above-mentioned method.

Second Milling Step

Next, similarly to the first milling step, the ion beams is irradiated to the film obtained in the above-mentioned film-forming step using the milling device M100 shown in FIG. 5, such that the inorganic alignment film is formed.

First, the counter substrate for liquid crystal panel with the $SiO_2$ film formed thereon is provided in the base substrate holder M3 within the vacuum chamber M2, and a pressure of the vacuum chamber is reduced to $1 \times 10^{-4}$ Pa by the air-discharging pump M4.

Next, argon gas is supplied from the gas supply source M13 into the ion source M1, and a voltage is applied to the filament M11, such that plasmas are generated. Then, an ion acceleration voltage is applied to the leading-out electrode M12, the ions are accelerated, such that the ions are irradiated to the $SiO_2$ film as ion beams. Moreover, the collision angle $\theta_b$ of the ion beams against the $SiO_2$ film is 5°.

Moreover, the angle $\theta_c$ of each of the inclined surfaces of the concave portions 31a formed at positions corresponding to the concave portions 51 on the transparent conductive film is 5°. In addition, the average width $W_1$ in the inclination direction of the inclined surface of the concave portions 31a is 10 nm, and the average width $W_2$ of the concave portions 31a in a direction orthogonal to the above-mentioned inclination direction is 15 nm.

Further, the collision angle $\theta_d$ of each of the inclined surfaces of the concave portions 31b having a relatively depth lower than the depth of the concave portions 31a formed at positions corresponding to the concave portions 51 on the transparent conductive film is 5°. In addition, the average width $W_3$ in the inclination direction of the inclined surfaces of the concave portions 31b is 10 nm, and the average width $W_4$ in a direction orthogonal to the above-mentioned inclination direction is 10 nm. Further, a current of the ion beams is 250 mA.

In such a manner, the counter substrate for the liquid crystal device with the inorganic alignment film formed thereon is obtained.

Further, similarly to the above method, the TFT substrate with the inorganic alignment film formed thereon is obtained.

The counter substrate for the liquid crystal device with the inorganic alignment film formed thereon and the TFT substrate with the inorganic alignment film formed thereon obtained in such a manner are bonded via the sealing material. This joining is performed such that the alignment direction of the inorganic alignment films is tilted 90° to allow the liquid crystal molecules constituting the liquid crystal layer to be left twisted.

Next, liquid crystal (MJ99247 of Merk & Co.) is injected into a space defined between the inorganic alignment film and the inorganic alignment film from a filling hole, and then the filling hole is closed. The thickness of the formed liquid crystal layer is about 3 μm.

Subsequently, to the outer surface of the counter substrate for liquid crystal panel and the outer surface of the TFT substrate, the polarizing film 8B and the polarizing film 7B are bonded respectively, such that the TFT liquid crystal panel having a structure shown in FIG. 4 is manufactured. As the polarizing film, a film made of polyvinylalcohol (PVA) and extended in one axis direction is used. Moreover, the joining direction of the polarizing film 7B and the polarizing film 8B is determined based on the alignment direction of the inorganic alignment film 3B and the inorganic alignment film 4B. That is, the polarizing film 7B and the polarizing film 8B are bonded such that incident light is transmitted when no voltage is applied and is not transmitted when a voltage is applied.

Moreover, the pretilt angle of the manufactured liquid crystal panel is in a range of 3 through 7°.

Examples 2 and 3

Except that the inorganic alignment film made of $SiO_2$ is formed under conditions in the respective milling step as shown in Table 1, the liquid crystal panel is manufactured similarly to Example 1.

Examples 4 through 6

Except that SiO is used as the target S2 and the inorganic alignment film made of SiO is formed under conditions in the respective milling step as shown in Table 1, the liquid crystal panel is manufactured similarly to Example 1.

Comparative Example 1

A solution (AL6256 of JSR (Japanese Synthetic Rubber) corporation) of polyimide-based resin (PI) is prepared, and a film having the average thickness of 0.05 μm is formed on the counter substrate for liquid crystal panel by a spic coat method, without using the device as shown in FIG. 5. Then, a rubbing process is performed on the film such that the pretilt angle is 2 through 3°, thereby forming an alignment film. Except that, similarly to the above-mentioned Example 1, a liquid crystal panel is manufactured. In Comparative Example 1, at the time of the rubbing process, dust particles or the like are generated.

Comparative Example 2

Except that the first milling step is not performed, a liquid crystal panel is manufactured similarly to Example 1.

Comparative Example 3

Except that the second milling step is not performed, a liquid crystal device is manufactured similarly to Example 1.

Comparative Example 4

Except that the ion beams collide against the transparent conductive film in a vertical direction in the first milling step and the ion beams collide against the film made of the inorganic material in a vertical direction in the second milling step, a liquid crystal panel is manufactured similarly to Example 1.

In Table 1, the conditions in the respective milling step are shown, and in Table 2, an angle of each of the inclined surfaces of the formed concave portions, the average widths $W_1$ through $W_4$, the average thickness of the alignment film, and the pretilt angles of the respective liquid crystal panel are shown.

TABLE 1

| | MATERIAL FOR ALIGNMENT FILM | PRESSURE WITHIN VACUUM CHAMBER IN FIRST MILLING STEP [Pa] | COLLISION ANGLE OF ION BEAM IN FIRST MILLING STEP [$\theta_a$] | ACCELERATION VOLTAGE IN FIRST MILLING STEP [V] | CURRENT OF ION BEAM IN FIRST MILLING STEP [mA] | PRESSURE WITHIN VACUUM CHAMBER IN SECOND MILLING STEP [Pa] | COLLISION ANGLE OF ION BEAM IN SECOND MILLING STEP [$\theta_b$] | ACCELERATION VOLTAGE IN SECOND MILLING STEP [V] | CURRENT OF ION BEAM IN SECOND MILLING STEP [mA] |
|---|---|---|---|---|---|---|---|---|---|
| EXAMPLE 1 | $SiO_2$ | $1.0 \times 10^{-4}$ | 3 | 800 | 300 | $1.0 \times 10^{-4}$ | 5 | 800 | 250 |
| EXAMPLE 2 | $SiO_2$ | $1.0 \times 10^{-4}$ | 5 | 800 | 300 | $1.0 \times 10^{-4}$ | 5 | 800 | 250 |
| EXAMPLE 3 | $SiO_2$ | $1.0 \times 10^{-4}$ | 10 | 800 | 300 | $1.0 \times 10^{-4}$ | 10 | 800 | 250 |
| EXAMPLE 4 | SiO | $1.0 \times 10^{-4}$ | 3 | 800 | 500 | $1.0 \times 10^{-4}$ | 5 | 800 | 300 |
| EXAMPLE 5 | SiO | $1.0 \times 10^{-4}$ | 5 | 800 | 500 | $1.0 \times 10^{-4}$ | 5 | 800 | 300 |
| EXAMPLE 6 | SiO | $1.0 \times 10^{-4}$ | 10 | 800 | 500 | $1.0 \times 10^{-4}$ | 10 | 800 | 300 |
| COMPARATIVE EXAMPLE 1 | PI | — | — | — | — | — | — | — | — |
| COMPARATIVE EXAMPLE 2 | $SiO_2$ | — | — | — | — | $1.0 \times 10^{-4}$ | 5 | 800 | 250 |
| COMPARATIVE EXAMPLE 3 | $SiO_2$ | $1.0 \times 10^{-4}$ | 3 | 800 | 300 | — | — | — | — |
| COMPARATIVE EXAMPLE 4 | $SiO_2$ | $1.0 \times 10^{-4}$ | 0 | 800 | 300 | $1.0 \times 10^{-4}$ | 0 | 800 | 250 |

TABLE 2

| | ANGLE $\theta_e$ OF INCLINED SURFACE OF CONCAVE PORTION 51 [°] | AVERAGE WIDTH $W_5$ OF CONCAVE PORTION 51 [nm] | AVERAGE WIDTH $W_6$ OF CONCAVE PORTION 51 [nm] | ANGLE $\theta_c$ OF INCLINED SURFACE OF CONCAVE PORTION 31a [°] | AVERAGE WIDTH $W_1$ OF CONCAVE PORTION 31a [nm] | AVERAGE WIDTH $W_2$ OF CONCAVE PORTION 31a [nm] | ANGLE $\theta_d$ OF INCLINED SURFACE OF CONCAVE PORTION 31b [°] | AVERAGE WIDTH $W_3$ OF CONCAVE PORTION 31b [nm] | AVERAGE WIDTH $W_4$ OF CONCAVE PORTION 31b [nm] | AVERAGE THICKNESS OF ALIGNMENT FILM [μm] | PRETILT ANGLE [°] |
|---|---|---|---|---|---|---|---|---|---|---|---|
| EXAMPLE 1 | 5 | 10 | 15 | 5 | 10 | 15 | 5 | 10 | 10 | 0.05 | 3 TO 7 |
| EXAMPLE 2 | 7 | 10 | 15 | 7 | 10 | 15 | 5 | 10 | 10 | 0.05 | 3 TO 7 |
| EXAMPLE 3 | 8 | 15 | 15 | 8 | 10 | 15 | 5 | 10 | 10 | 0.05 | 3 TO 7 |
| EXAMPLE 4 | 3 | 10 | 10 | 5 | 10 | 10 | 5 | 10 | 10 | 0.03 | 3 TO 7 |
| EXAMPLE 5 | 3 | 10 | 10 | 5 | 10 | 10 | 5 | 10 | 10 | 0.03 | 3 TO 7 |
| EXAMPLE 6 | 5 | 10 | 10 | 5 | 10 | 10 | 5 | 10 | 10 | 0.03 | 3 TO 7 |
| COMPARATIVE EXAMPLE 1 | — | — | — | — | — | — | — | — | — | 0.05 | 2 TO 3 |
| COMPARATIVE EXAMPLE 2 | — | — | — | — | — | — | 5 | 10 | 10 | 0.05 | — |
| COMPARATIVE EXAMPLE 3 | 5 | 10 | 15 | — | — | — | — | — | — | 0.05 | — |
| COMPARATIVE EXAMPLE 4 | — | — | — | — | — | — | — | — | — | 0.05 | — |

Evaluation of Liquid Crystal Panel

With respect to the liquid crystal panels manufactured in the respective Examples and Comparative Examples, light transmittance is consecutively measured. The measurement of light transmittance is performed by setting the temperature of the respective liquid crystal panels to 50° C. and irradiating white light component of light flux density of 151 m/mm² in a state in which a voltage is not applied.

Moreover, the evaluation of the liquid crystal panels is performed with a reference which is a time (a light resistant time) at which light transmittance from the irradiation beginning of white light component of the liquid crystal panel manufactured in Comparative Example 1 is lowered up to 50% as compared with the initial light transmittance, and is divided into four stages as follows.

⊙: The light resistant time is five or more times Comparative Example 1.

○: The light resistant time is two to below five times Comparative Example 1.

Δ: The light resistant time is one to below two times Comparative Example 1.

x: The light resistant time is below Comparative Example 1.

Evaluation of Liquid Crystal Projector (Electronic Apparatus)

Using the TFT liquid crystal panels manufactured in the respective Examples and Comparative Examples, the liquid crystal projector (an electronic apparatus) having a structure as shown in FIG. 11 is assembled, and is consecutively driven for 7000 hours.

Moreover, as regards the evaluation of the liquid crystal projector, the evaluation of resolution is performed by observing projected images during 7000 hours after driving and is divided into four states as follows.

⊙: Bright projected images are observed.

○: Almost bright projected images are observed.

Δ: Slight resolution-deteriorated projected images are observed.

x: Dull projected images are observed.

The evaluation results are shown in Table 3.

TABLE 3

| | LIGHT RESISTANCE | RESOLUTION AFTER DRIVING FOR 7000 HOURS |
|---|---|---|
| EXAMPLE 1 | ⊙ | ⊙ |
| EXAMPLE 2 | ⊙ | ⊙ |
| EXAMPLE 3 | ⊙ | ⊙ |
| EXAMPLE 4 | ⊙ | ⊙ |
| EXAMPLE 5 | ⊙ | ⊙ |
| EXAMPLE 6 | ⊙ | ⊙ |
| COMPARATIVE EXAMPLE 1 | — | X |
| COMPARATIVE EXAMPLE 2 | ⊙ | Δ |
| COMPARATIVE EXAMPLE 3 | ⊙ | Δ |
| COMPARATIVE EXAMPLE 4 | ⊙ | X |

As apparent from Table 3, the liquid crystal panel according to the present invention exhibits excellent light resistance as compared with Comparative Example 1.

Further, in the liquid crystal panel according to the present invention, it is possible to obtain a sufficient pretilt angle and effectively regulate the alignment state of the liquid crystal molecules. On the contrary, in the liquid crystal panels according to Comparative Examples 2 through 4, it is impossible to obtain the sufficient pretilt angle, and further it is difficult to regulate the alignment state of the liquid crystal molecules.

Further, in the liquid crystal projector (an electronic apparatus) manufactured using the liquid crystal panels according to Examples 1 through 6, it is possible to obtain bright projected images even when the liquid crystal projector is consecutively driven for a long time.

On the contrary, in the liquid crystal projector manufactured using the liquid crystal panel according to Comparative Example 1, bright projected images can be obtained at the earlier state, but resolution of the projected images is remarkably reduced after 7000 hours. This may be because, though the alignment of the liquid crystal molecules is aligned at the earlier stage, the alignment film is deteriorated and the degree of alignment of the liquid crystal molecules are lowered, due to driving for a long time.

Further, the personal computer, the cellular phone and the digital still camera comprising the liquid crystal panel according to the present invention are manufactured, and the same evaluation is performed on these apparatuses, such that the same results are obtained.

From these results, it can be seen that the liquid crystal panel and the electronic apparatus have excellent light resistance and maintain stable properties even when they are used for a long time.

What is claimed is:

1. A method of forming an inorganic alignment film on a base substrate, comprising:
   a first milling step of irradiating ion beams to a surface of the base substrate, on which the inorganic alignment film is to be formed, from a direction inclined at a predetermined angle $\theta_a$ with respect to a direction orthogonal to the surface of the base substrate;
   a film-forming step of forming a film made substantially of an inorganic material on the base substrate to which the ion beams are irradiated; and
   a second milling step of irradiating ion beams to a surface of the film from a direction inclined at a predetermined angle $\theta_b$ with respect to the direction orthogonal to the surface of the base substrate on which the film is formed.

2. The method of forming an inorganic alignment film according to claim 1,
   wherein in the first milling step, concave portions having a predetermined directivity are formed in the surface of the base substrate on which the film is to be formed.

3. The method of forming an inorganic alignment film according to claim 1,
   wherein in the first milling step, the predetermined angle $\theta_a$ is at least about 2°.

4. The method of forming an inorganic alignment film according to claim 1,
   wherein in the first milling step, an acceleration voltage of the ion beams during the irradiation of the ion beams is about 400 to about 1400 V.

5. The method of forming an inorganic alignment film according to claim 1,
   wherein in the first milling step, a current of the ion beams irradiated is about 100 to about 1000 mA.

6. The method of forming an inorganic alignment film according to claim 1,
   wherein in the first milling step, a pressure of an atmosphere near the base substrate is about $5.0 \times 10^{-1}$ Pa or less.

7. The method of forming an inorganic alignment film according to claim 1,
   wherein in the second milling step, concave portions having a predetermined directivity are formed in the film.

8. The method of forming an inorganic alignment film according to claim 1,
   wherein in the second milling step, the predetermined angle $\theta_b$ is at least about 2°.

9. The method of forming an inorganic alignment film according to claim 1,
   wherein in the second milling step, an acceleration voltage of the ion beams during the irradiation of the ion beams is about 400 to about 1400 V.

10. The method of forming an inorganic alignment film according to claim 1,
    wherein in the second milling step, a current of the ion beams irradiated is about 100 to about 1000 mA.

11. The method of forming an inorganic alignment film according to claim 1,
    wherein in the second milling step, a pressure of an atmosphere near the film is about $5.0 \times 10^{-1}$ Pa or less.

12. The method of forming an inorganic alignment film according to claim 1,
    wherein the film-forming step further comprises forming the film by a sputtering method.

13. The method of forming an inorganic alignment film according to claim 1,
    wherein the inorganic material substantially comprises silicon oxide.

14. An inorganic alignment film formed by a method of forming an inorganic alignment film according to claim 1.

15. The inorganic alignment film according to claim 14,
    wherein an average thickness of the inorganic alignment film is about 0.02 to about 0.3 μm.

16. A substrate for an electronic device, comprising:
    electrodes on a substrate; and
    an inorganic alignment film according to claim 14 on the substrate.

17. A liquid crystal panel comprising:
    an inorganic alignment film according to claim 14; and
    a liquid crystal layer.

18. A liquid crystal panel comprising:
    a pair of inorganic alignment films according to claim 14; and
    a liquid crystal layer interposed between the pair of inorganic alignment films.

19. An electronic apparatus comprising a liquid crystal panel according to claim 17.

20. An electronic apparatus comprising light valves, each light valve having a liquid crystal panel according to claim 17,
    wherein an image is projected using at least one of the light valves.

21. An electronic apparatus comprising:
    three light valves, corresponding to red, green and blue, which form an image;
    a light source;
    a color separating optical system separating light from the light source into red, green and blue light components and guiding each light component to the corresponding light valve;

a color synthesizing optical system synthesizing the image; and a projecting optical system projecting the synthesized image, wherein each light valve comprises a liquid crystal panel as claimed in claim 17.

* * * * *